United States Patent
Bross et al.

(10) Patent No.: US 8,694,394 B2
(45) Date of Patent: Apr. 8, 2014

(54) METHODS, DATA RECORD, SOFTWARE INTERFACE, DATA WAREHOUSE MODULE AND SOFTWARE APPLICATION FOR EXCHANGING TRANSACTION-TAX-RELATED DATA

(75) Inventors: Wolfgang Bross, Schönaich (DE); Norbert Heumueller, Herrenberg (DE); Fritz Oesterle, Nagold (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 3470 days.

(21) Appl. No.: 10/495,634

(22) PCT Filed: Nov. 26, 2001

(86) PCT No.: PCT/EP01/13756
§ 371 (c)(1),
(2), (4) Date: Oct. 27, 2004

(87) PCT Pub. No.: WO03/044663
PCT Pub. Date: May 30, 2003

(65) Prior Publication Data
US 2005/0125335 A1  Jun. 9, 2005

(30) Foreign Application Priority Data
Nov. 19, 2001 (WO) ............ PCT/EP01/13375

(51) Int. Cl.
*G06F 17/22* (2006.01)
*G07F 19/00* (2006.01)

(52) U.S. Cl.
USPC ............ 705/31; 705/30; 705/32; 705/34; 705/36 T

(58) Field of Classification Search
None
See application file for complete search history.

(56) References Cited

U.S. PATENT DOCUMENTS

| 6,078,899 A | 6/2000 | Francisco et al. |
| 6,298,333 B1 | 10/2001 | Manzi et al. |
| 6,308,178 B1 * | 10/2001 | Chang et al. ............. 707/100 |
| 6,629,081 B1 * | 9/2003 | Cornelius et al. ............ 705/30 |
| 6,993,502 B1 * | 1/2006 | Gryglewicz et al. ........... 705/19 |
| 2001/0032197 A1 * | 10/2001 | Chandra et al. ............. 705/412 |
| 2002/0062346 A1 * | 5/2002 | Chen ........................ 709/204 |
| 2003/0061061 A1 * | 3/2003 | Cox et al. ...................... 705/1 |
| 2003/0093320 A1 * | 5/2003 | Sullivan ....................... 705/19 |

FOREIGN PATENT DOCUMENTS

| EP | 1016989 | 7/2000 |
| WO | WO-9956206 | 11/1999 |
| WO | WO-0141552 | 6/2001 |
| WO | WO-0163455 | 8/2001 |

OTHER PUBLICATIONS

Architectural Choices for OSS Integration; by Arald Jean-Charles and Suhas D Joshi; www.eaijournal.com/pdf/ossarchitecture.pdf.

(Continued)

*Primary Examiner* — Fateh Obaid

(57) ABSTRACT

The invention is directed to a computer-based method performed in a first transaction-tax-related application. The method comprises exchanging transaction-related data with at least a second transaction-tax-related application according to a standardized transaction-tax interface data model. The invention is also directed to another computer-based method and a related data record, a related software interface, a related computer-based data warehouse module and a related software application.

18 Claims, 19 Drawing Sheets

(56) References Cited

OTHER PUBLICATIONS

Graupner, Sven, Et Al: E-speak an XML document interchange engine; Electronic Commerce and Web Technologies, Second International Conference, EC-Web 2001, Lecture Notes in Computer Science, vol. 2115, pp. 270-279. 2001.

Gupta, V,R,, Art introduction to data warehousing; White Paper, System services corp, chicago, IIII, Aug. 1997.

Hewlett-Packard Company, Data warehousing on HP 3000 using IMAGE/SQL. A new alternative; HP white paper; <URL://www.hp.com/prodocts1/mpeixservers/info_library/softwre/59683829.pdf> retrieved Mar. 7, 2002.

Kao, J, Developers guide to building XML-based web services with the java 2 platform, enterprise edition (J2 james kao; Sun rnicrosystems. INC, Jun. 2001.

Sabrix, Inc., TaxBay Architecture Guide, <URL:http://www.sabrix.com/TaxBayArchitecture.pdf>, retrieved on May 31, 2002.

* cited by examiner

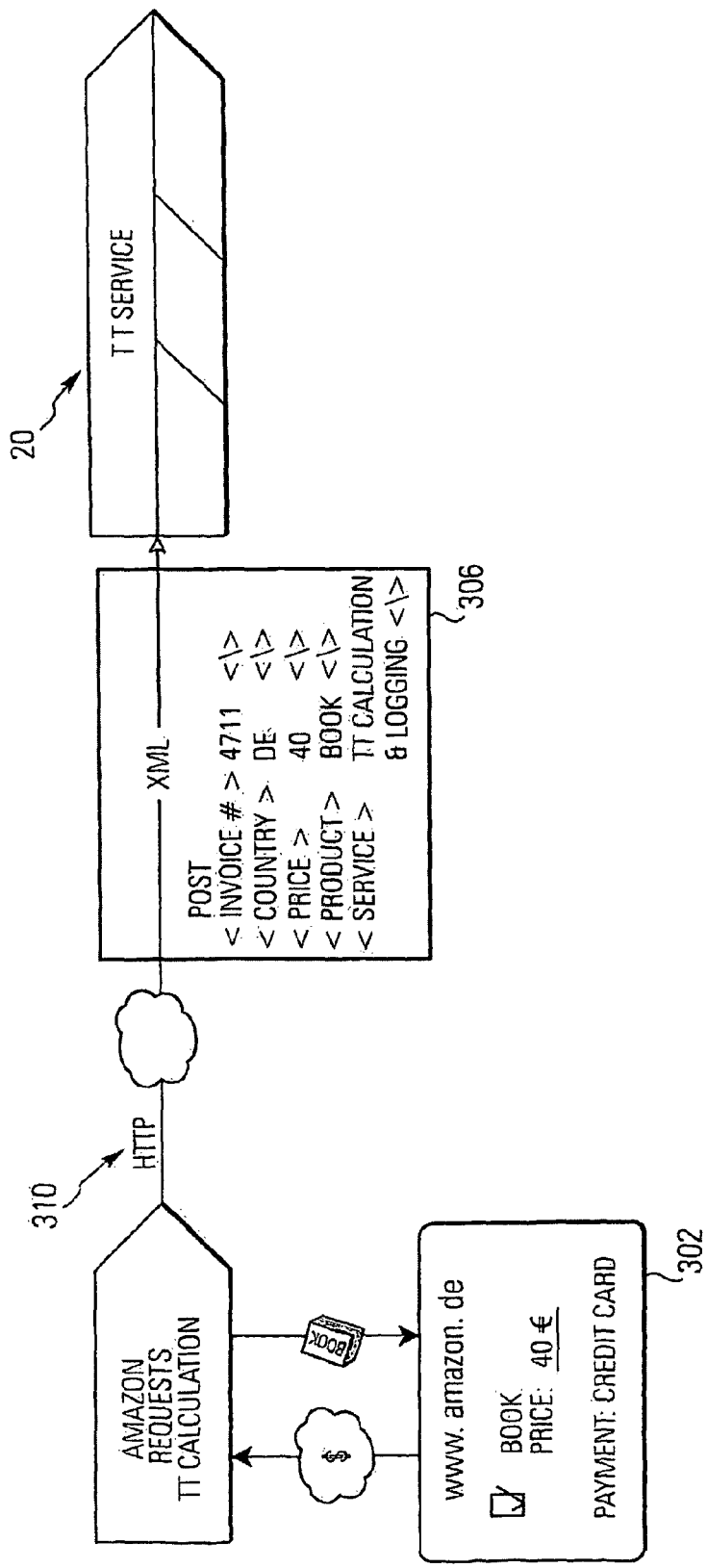

P/C: PROCESSING/COMMUNICATION

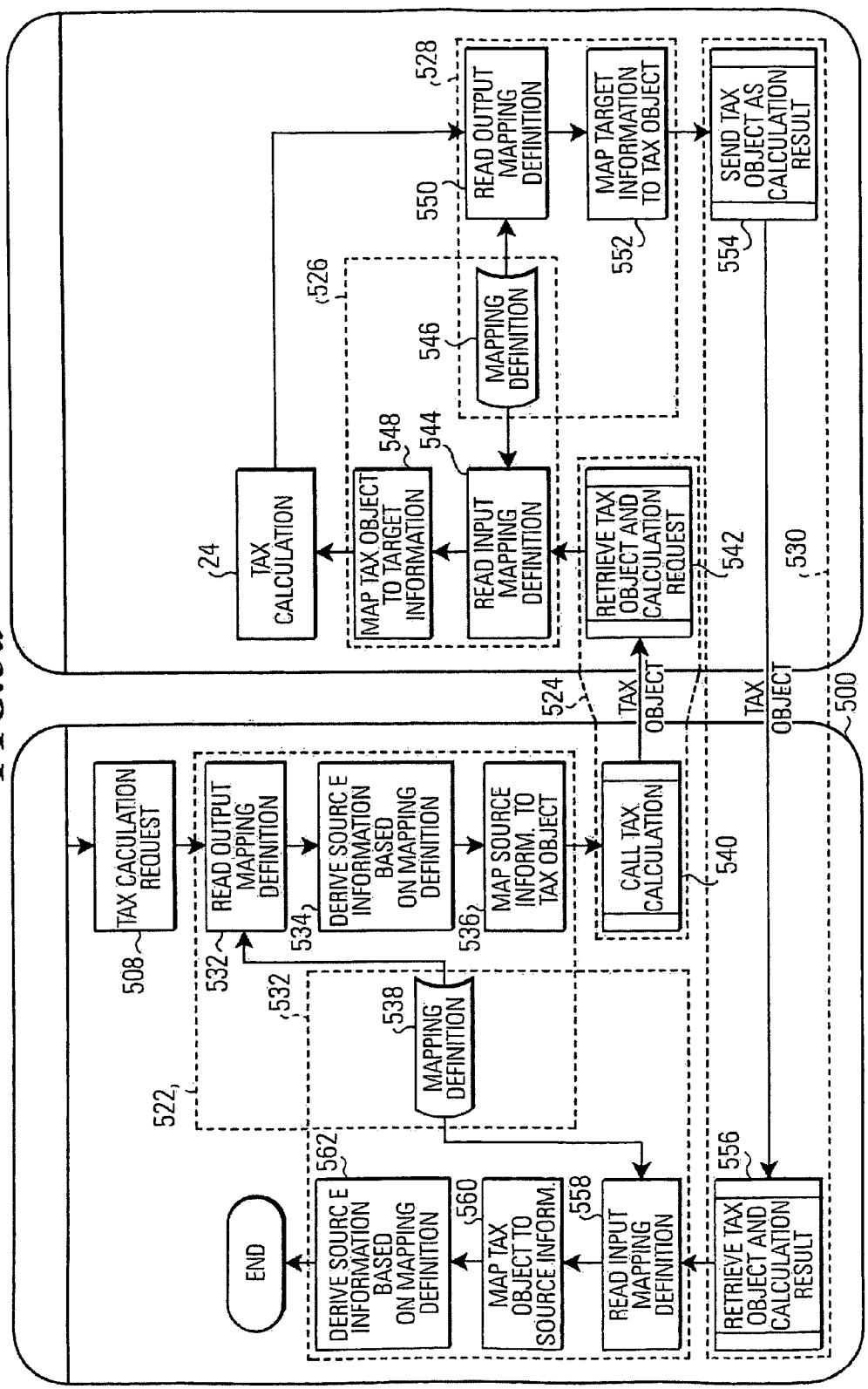

FIG. 6a

INBOUND ELEMENTS

| FIELD NO. | DATA ELEMENT | SUB DATA ELEMENT | TYPE | DESCRIPTION | REQUIRED |
|---|---|---|---|---|---|
| 1. | COMPANY-ID | | | LEGAL ENTITY, WHICH IS ASSOCIATED THE TRANSACTION | x |
| 2. | DIVISION | | | USED IN REPORTING TO IDENTIFY THE BUSINESS WITHIN A COMPANY | |
| 3. | CREATOR | | | APPLICATION, WHICH PASSES TRANSACTION TO TRXN TAX ENGINE | |
| 4. | SHIP-FROM ADDRESS | | | SHIP-FROM LOCATION ADDRESS | x |
| 5. | | STREET | | STREET ADDRESS | |
| 6. | | TERRITORY | | TERRITORY | |
| 7. | | PROVINCE | | PROVINCE, USED FOR JURISDICTION PROCESSING FOR US | |
| 8. | | COUNTY | | COUNTY | |
| 9. | | CITY | | CITY | |
| 10. | | POSTAL CODE | | POSTAL CODE | |
| 11. | | STATE | | STATE | |
| 12. | | COUNTRY | | ISO COUNTRY CODE | |
| 13. | DESTINATION/SHIP-TO ADDRESS | | | SHIP-TO ADDRESS FOR GOODS, PERFORMED-AT-ADDRESS FOR SERVICES | x |
| 14. | | NAME | | NAME OF COMPANY RECEIVING GOODS OR SERVICES | |
| 15. | | STREET | | STREET ADDRESS | |
| 16. | | TERRITORY | | TERRITORY | |
| 17. | | PROVINCE | | PROVINCE, USED FOR JURISDICTION PROCESSING FOR US | |
| 18. | | COUNTY | | COUNTY | |
| 19. | | CITY | | CITY | |
| 20. | | POSTAL CODE | | POSTAL CODE | |
| 21. | | STATE | | STATE | |
| 22. | | COUNTRY | | ISO COUNTRY CODE | |
| 23. | ORIGIN/POO ADDRESS | | | SELLER ADDRESS, FOR US POINT OF ORDER ORIGIN | |
| 24. | | STREET | | STREET ADDRESS | |
| 25. | | TERRITORY | | TERRITORY | |
| 26. | | PROVINCE | | PROVINCE, USED FOR JURISDICTION | |

FIG. 6b

| FIELD NO. | DATA ELEMENT | SUB DATA ELEMENT | TYPE | DESCRIPTION | REQUIRED |
|---|---|---|---|---|---|
| | | | | PROCESSING FOR US | |
| 27. | | COUNTY | | COUNTY | |
| 28. | | CITY | | CITY | |
| 29. | | POSTAL CODE | | POSTAL CODE | |
| 30. | | STATE | | STATE | |
| 31. | | COUNTRY | | ISO COUNTRY CODE | |
| 32. | POA ADDRESS | | | POINT OF ORDER ACCEPTANCE ADDRESS | |
| 33. | | STREET | | STREET ADDRESS | |
| 34. | | TERRITORY | | TERRITORY | |
| 35. | | PROVINCE | | PROVINCE, USED FOR JURISDICTION PROCESSING FOR US | |
| 36. | | COUNTY | | COUNTY | |
| 37. | | CITY | | CITY | |
| 38. | | POSTAL CODE | | POSTAL CODE | |
| 39. | | STATE | | STATE | |
| 40. | | COUNTRY | | ISO COUNTRY CODE | |
| 41. | INVOICE- TO ADDRESS | | | INVOICE-TO/ BILL-TO ADDRESS | |
| 42. | | NAME | | NAME OF COMPANY RECEIVING INVOICE | |
| 43. | | STREET | | STREET ADDRESS | |
| 44. | | TERRITORY | | TERRITORY | |
| 45. | | PROVINCE | | PROVINCE, USED FOR JURISDICTION PROCESSING FOR US | |
| 46. | | COUNTY | | COUNTY | |
| 47. | | CITY | | CITY | |
| 48. | | POSTAL CODE | CHAR(5) | POSTAL CODE | |
| 49. | | STATE | | STATE | |
| 50. | | COUNTRY | | ISO COUNTRY CODE | |
| 51. | SOLD- TO ADDRESS | | | ADDRESS OF THE CONTRACTUAL RELATIONSHIP | |
| 52. | | NAME | | NAME OF COMPANY | |
| 53. | | STREET | | STREET ADDRESS | |
| 54. | | TERRITORY | | TERRITORY | |
| 55. | | PROVINCE | | PROVINCE, USED FOR JURISDICTION PROCESSING FOR US | |
| 56. | | COUNTY | | COUNTY | |
| 57. | | CITY | | CITY | |
| 58. | | POSTAL CODE | CHAR(5) | POSTAL CODE | |
| 59. | | STATE | | STATE | |

FIG. 6c

| FIELD NO. | DATA ELEMENT | SUB DATA ELEMENT | TYPE | DESCRIPTION | REQUIRED |
|---|---|---|---|---|---|
| 60. | | COUNTRY | | ISO COUNTRY CODE | |
| 61. | POINT-OF-TITLE PASSAGE | | | LOCATION AT WHICH LEGAL TITLE HAS TRANSFERRED TO THE PURCHASER (POO/SHIP FROM LOCATION, SHIP-TO LOCATION) US-ONLY | |
| 62. | TRANSACTION TYPE | | | DESCRIBES THE TYPE OF TRANSACTION (SALES OR PURCHASE) | |
| 63. | KIND OF TRANSACTION | | | DESCRIBES THE TRANSACTION (NORMAL PURCHASE/SALES, LEASE, RENTAL, RETURN....) | |
| 64. | INVOICE DATE/TAX POINT | | | DATE INVOICE IS ISSUED. USED AS REFERENCE FOR TAX CALCULATION. FOR CREDIT/ CORRECTIONS, THIS NEED TO BE THE ORIGINAL DATE OF THE INVOISE | |
| 65. | DELIVERY DATE/ TRANSACTION DATE | | | DATE GOODS ARE DELIVERED, SHIPPED OR MOVED | |
| 66. | MODE OF TRANSPORT | | | DESCRIBE MEANS BY WHICH THE GOODS ARE TRANSPORTED (SEA, RAIL, ROAD, AIR) | |
| 67. | COMMODITY/SERVICE CODE (PRODUCT CODE FOR US) | | | IDENTIFIES THE TYPE OF PRODUCT AND IS NEEDED FOR TAX RATE DETERMINATION | |
| 68. | CREDIT/CORRECTION INDICATOR | | | IDENTIFIES CREDIT/CORRECTION TRANSACTION | |
| 69. | REASON CODE | | | REASON FOR EXEMPTION FROM TAX (US ONLY) | |
| 70. | | COUNTRY | | | |
| 71. | | STATE/PROVINCE | | | |
| 72. | | COUNTY | | | |
| 73. | | CITY | | | |
| 74. | TAX CERTIFICATE NUMBER | | | TAX CERTIFICATE NUMBER, WHICH INDICATES THAT THE TRANSACTION IS EXEMPT FROM TAXES | |
| 75. | | COUNTRY | | | |
| 76. | | STATE/PROVINCE | | | |
| 77. | | COUNTY | | | |
| 78. | | CITY | | | |
| 79. | EXEMPTION CERTIFICATE TYPE | | | KEY TYPE OF CERTIFICATE (US ONLY) | |
| 80. | INVOICE/DOKUMENT NUMBER | | | DOCUMENT NUMBER | |
| 81. | CUSTOMER NUMBER | | | UNIQUE IDENTIFICATION FOR CUSTOMER | |
| 82. | CUSTOMER NAME | | | | |
| 83. | CONTRACT NUMBER | | | CONTRACT RELATED TO TRANSACTION | |
| 84. | CURRENCY | | | CODE IDENTIFYING THE CURRENCY USED ON DOCUMENT | |
| 85. | UNIT OF MEASURE | | | | |

FIG. 6d

| FIELD NO. | DATA ELEMENT | SUB DATA ELEMENT | TYPE | DESCRIPTION | REQUIRED |
|---|---|---|---|---|---|
| 86. | PRODUCT NUMBER | | | NUMBER OF PRODUCT | |
| 87. | PRODUCT DESCRIPTION | | | DESCRIPTION OF GOOD OR SERVICE | |
| 88. | ORIGINAL DOCUMENT NUMBER | | | REFERENCE TO ORIGINAL DOCUMENT. USED FOR CREDIT/CORRECTION TRANSACTIONS | |
| 89. | DOCUMENT TYPE | | | ORDER, TRADE INVOICE, PURCHASE ORDER, BILL OF LADING | |
| 90. | AGENT INDICATOR | | | AGENT USED FOR REPORTING OF THIS TRANSACTION | |
| 91. | COUNTRY OF ORIGIN | | | COUNTRY IN WHICH GOODS ORIGINATE OR PLACE, WHERE THE LAST SIGNIFICANT PROCESSING OR MANUFACTURING TOOK PLACE | |
| 92. | DESTINATION CODE | | | REGION OF DISPATCH/ARRIVAL, WHERE THE GOODS ARE PRODUCED, ASSEMBLED, PROCESSED, REPAIRED OR MAINTAINED (EU ONLY) | |
| 93. | DELIVERY TERM | | | FREIGHT CODE REPRESENTING TERMS OF TRADE BETWEEN A BUYER AND A SELLER (INCO TERMS) | |
| 94. | PORT OF LOADING | | | NATURE OF TRANSACTION | |
| 95. | DISTANCE SALE INDICATOR | | | TRANSACTION IS A DISTANCE SALE. ALLOWS TO DISTINGUISH SALES ABOVE AND UNDER THE THRESHOLD | |
| 96. | STATISTICAL PROCEDURE | | | FLOW AND PROCESS OF MERCHANDISE. (EU ONLY- INTRASTAT) | |
| 97. | NEW MEANS OF TRANSPORT INDICATOR | | | TRANSACTION INVOLVES NEW MEAN OF TRANSPORT | |
| 98. | AFFILIATION | | | INDICATES AN AFFILIATION BETWEEN DECLARANT AND BUSINESS PARTNER | |
| 99. | FISCAL DATE | | | DATE FOR WHICH THE TRANSACTION IS REPORTED | |
| 100. | TAX LEVEL | | | DEFINE AT WHICH JURISDICTION LEVEL TAX SHOULD BE CALCULATED (US ONLY) | |
| 101. | SELLER REGISTRATION NUMBER | | | IN CASE THIS FIELD IS FILLED, TAX ENGINE WILL NOT CHECK AGAINST THEIR COMPANY LEGAL STRUCTURE | |
| 102. | BUYER REGISTRATION NUMBER | | | TAX REGISTRATION NUMBER OF BUYER | |
| 103. | AGENT REGISTRATION NUMBER | | | | |
| 104. | OVERRIDE TAX RATE | | | OVERRIDE OVER SYSTEM DETERM. TAX RATE. USED TO PASS A TRANSACTION ONLY INTO THE AUDIT FILE | |
| 105. | | TERRITORY | | | |
| 106. | | PROVINCE | | | |
| 107. | | COUNTY | | | |
| 108. | | CITY | | | |
| 109. | | STATE | | | |

FIG. 6e

| FIELD NO. | DATA ELEMENT | SUB DATA ELEMENT | TYPE | DESCRIPTION | REQUIRED |
|---|---|---|---|---|---|
| 110. | | COUNTRY | | | |
| 111. | OVERRIDE TRXN TAX AMOUNT | | | OVERRIDE OVER SYSTEM DETERMINED TAX RATE. USED TO PASS A TRANSACTION ONLY INTO THE AUDIT FILE | |
| 112. | | TERRITORY | | | |
| 113. | | PROVINCE | | | |
| 114. | | COUNTY | | | |
| 115. | | CITY | | | |
| 116. | | STATE | | | |
| 117. | | COUNTRY | | | |
| 118. | INVOICE LINE NUMBER | | | | |
| 119. | INVOICE SUMMARY INDICATOR | | | INDICATES, THAT THIS TRANSACTION LINE REPRESENTS AN INVOICE SUMMARY | |
| 120. | LINE ITEM AMOUNT | | | PRICE OF GOODS/SERVICES ON THE LINE ITEM | |
| 121. | OVER TAX AMOUNT | | | ANY DUTY OR EXTRANEOUS TAX AMOUNTS | |
| 122. | DISCOUNT AMOUNT | | | AMOUNT BEING DISCOUNTED FOR THE INVOICE OR THE LINE ITEM | |
| 123. | FREIGHT AMOUNT | | | COST ASSOCIATED WITH THE TRANSPORTATION | |
| 124. | INSURANCE AMOUNT | | | COST OF INSURANCE ON GOODS RELATING TO GOODS FLOW | |
| 125. | EXEMPT AMOUNT | | | AMOUNT OF THE TRANSACTION, WHICH IS EXEMPT FROM TAX | |
| 126. | | TERRITORY | | | |
| 127. | | PROVINCE | | | |
| 128. | | COUNTY | | | |
| 129. | | CITY | | | |
| 130. | | STATE | | | |
| 131. | | COUNTRY | | | |
| 132. | INSURANCE AMOUNT FOREIGN | | | INSURANCE ON GOODS RELATED TO THE PART OF THE FLOW, WHICH TOOK PART OUTSIDE OF TAXATION JURISDICTION | |
| 133. | FREIGHT AMOUNT FOREIGN | | | FREIGHT AMOUNT RELATED TO THE PART OF THE FLOW, WHICH TOOK PART OUTSIDE OF TAXATION JURISDICTION | |
| 134. | REDUCED BAIS PERCENTAGE | | | USED TO REDUCE THE TAXABLE GROSS AMOUNT BEFORE CACULATING TAX (US) | |
| 135. | CURRENCY CONVERSION FACTOR | | | USED TO CONVERT AMOUNTS FOR REPORTING/INVOICING PURPOSES | |
| 136. | NET/MASS/VOLUME | | | WEIGTH/VOLUME OF GOODS INVOLVED IN TRANSACTION | |
| 137. | RECOVERABLE PERCENTAGE | | | PERCENTAGE USED TO CALCULATE RECOVERABLE AMOUNT (DEFAULT = 100%) | |

FIG. 6f

OUTBOUND ELEMENTS

| FIELD NO. | DATA ELEMENT | SUB DATA ELEMENT | TYPE | DESCRIPTION |
|---|---|---|---|---|
| 1. | COMPLETION CODE | | | CODE PROVIDING INFORMATION HOW THE SYSTEM HAS PROCESSED THE TRANSACTION |
| 2. | | OVERALL | | |
| 3. | | COUNTRY | | |
| 4. | | TERRITORY | | |
| 5. | | STATE | | |
| 6. | | PROVINCE | | |
| 7. | | COUNTY | | |
| 8. | | CITY | | |
| 9. | OVERALL COMPLETION CODE DESCRIPTION | | | DESCRIPTION COMPLETION CODE OVERALL |
| 10. | ERROR CODE | | | CODE INDICATING, WHY A TRANSACTION WASN'T PROCESSED |
| 11. | PROCESSING DATE | | | DATE, WHEN THE TRANSACTION WAS PROCESSED |
| 12. | TRANSACTION NUMBER | | | UNIQUE IDENTIFIER OF TRANSACTION PROCESSED BY TRXN TAX ENGINE |
| 13. | ZERO RATE INDICATOR | | | INDICATES, WHETHER THERE IS NO TAX ON THE TRANSACTION OR THE TRANSACTION IS ZERO-RATED |
| 14. | ZERO RATE REASON | | | INDICATE, WHETHER A TRANSACTION IS ZERO-RATED |
| 15. | TAXING LOCATION | | | LOCATION TO BE DETERMINED TO BE THE TAXING LOCATION (POO, POA, SHIP-FROM, SHIP-TO, INVOICE-TO,...) |
| 16. | JURISDICTION APPLIED | | | JURISDICTION APPLIED FOR TAXATION |
| 17. | | CONTRY | | |
| 18. | | TERRITORY | | |
| 19. | | STATE | | |
| 20. | | PROVINCE | | |
| 21. | | COUNTY | | |
| 22. | | CITY | | |
| 23. | | POSTAL CODE | | |
| 24. | TAX TYPE | | | TYPE OF TAY DETERMINED |
| 25. | | CONTRY | | |
| 26. | | TERRITORY | | |
| 27. | | STATE | | |
| 28. | | PROVINCE | | |

FIG. 6g

| FIELD NO. | DATA ELEMENT | SUB DATA ELEMENT | TYPE | DESCRIPTION |
|---|---|---|---|---|
| 29. | | COUNTY | | |
| 30. | | CITY | | |
| 31. | | POSTAL CODE | | |
| 32. | TAX CERTIFICATE APPLIED | | | NUMBER OF CERTIFICATE APPLIED TO THIS TRANSACTION (US) |
| 33. | | COUNTRY | | |
| 34. | | TERRITORY | | |
| 35. | | STATE | | |
| 36. | | PROVINCE | | |
| 37. | | COUNTY | | |
| 38. | | CITY | | |
| 39. | | POSTAL CODE | | |
| 40. | EXEMPT REASON | | | INDICATOR FOR EXEMPT REASON |
| 41. | | COUNTRY | | |
| 42. | | TERRITORY | | |
| 43. | | STATE | | |
| 44. | | PROVINCE | | |
| 45. | | COUNTY | | |
| 46. | | CITY | | |
| 47. | | POSTAL CODE | | |
| 48. | CALCULATE TAX AMOUNT | | | TAX AMOUNT CALCULATE |
| 49. | | OVERALL | | SUMMARY OF ALL DETAIL LEVELS |
| 50. | | COUNTRY | | |
| 51. | | TERRITORY | | |
| 52. | | STATE | | |
| 53. | | PROVINCE | | |
| 54. | | COUNTY | | |
| 55. | | CITY | | |
| 56. | | POSTAL CODE | | |
| 57. | TAX RATE APPLIED | | | TAX RATE USED FOR CALCULATION |
| 58. | | COUNTRY | | |
| 59. | | TERRITORY | | |
| 60. | | STATE | | |
| 61. | | PROVINCE | | |
| 62. | | COUNTY | | |
| 63. | | CITY | | |
| 64. | | POSTAL CODE | | |

FIG. 6h

| FIELD NO. | DATA ELEMENT | SUB DATA ELEMENT | TYPE | DESCRIPTION |
|---|---|---|---|---|
| 65. | LINE ITEM SUM | | | SUM OF ALL AMOUNT FOR THE LINE ITEM |
| 66. | INVOICE SUM | | | GROSS AMOUNT OF INVOICE (INCLUDING TAX) |
| 67. | BASIS AMOUNT | | | AMOUNT USED FOR TAX CALCULATION |
| 68. | | COUNTRY | | |
| 69. | | TERRITORY | | |
| 70. | | STATE | | |
| 71. | | PROVINCE | | |
| 72. | | COUNTY | | |
| 73. | | CITY | | |
| 74. | | POSTAL CODE | | |
| 75. | REPORT INDICATOR | | | INDICATES ONTO WHICH REPORT (INTRASTAT, RETURN, VIES) THIS TRANSACTION BELONGS |
| 76. | TITLES | | | SPECIFIC SENTENCE, WHICH NEED TO APPEAR ON THE LEGAL DOCUMENTS LIKE INVOICE |
| 77. | RECOVERABLE INDICATOR | | | INDICATES, WHETHER OR NOT TAX FOR THIS TRANSACTION IS RECOVERABLE |
| 78. | ACCOUNTING REFERENCE | | | REFERENCE TO ACCOUNT TO WHICH THE TAX AMOUNTS SHOULD BE BOOKED |
| 79. | EXTERNAL TAX REFERENCE | | | REFERENCE TO EXTERNAL TAX IDENTIFICATION NEEDED FOR FURTHER PROCESSING WITHIN THE CALLING APPLICATION (I.E. SAP TAX CODE) |

PROCESSING ELEMENTS

| FIELD NO. | DATA ELEMENT | SUB DATA ELEMENT | TYPE | DESCRIPTION |
|---|---|---|---|---|
| 1. | LANGUAGE | | | IDENTIFIES LANGUAGE USED FOR THIS DOCUMENT |
| 2. | CALCULATION MODE | | | MODE OF CALCULATION (BACK CALCULATION TAX AMOUNT ALREADY PASSED) |
| 3. | AUDIT FILE INDICATOR | | | TRANSACTION SHOULD BE LOGGED (IS FINAL TRANSACTION) |
| 4. | EXEMPTION SYSTEM USE | | | INDICATES THAT EXEMPTION INFORMATION HAS TO BE RETRIEVED FROM A SPECIFIC EXEMPTION DOCUMENT ENGINE |
| 5. | EXEMPTION LEVEL | | | INDICATES, WHICH THE EXEMPTION SHOULD BE USED |
| 6. | END OF INVOICE INDICATOR | | | INDICATE THE END OF THE DOCUMENT |
| 7. | INVOICE SUMMARY INDICAT. | | | TRANSACTION IS INVOICE SUMMARY |
| 8. | REVERSE CHARGE INDICATOR | | | INDICATES THE USE THE REVERSE CHARGE MECHANISM |
| 9. | REPORT EXCLUSION INDICATOR | | | INDICATES, THAT THIS TRANSACTION SHOULD BE EXCLUDED FROM TO BE DEFINED REPORTING |

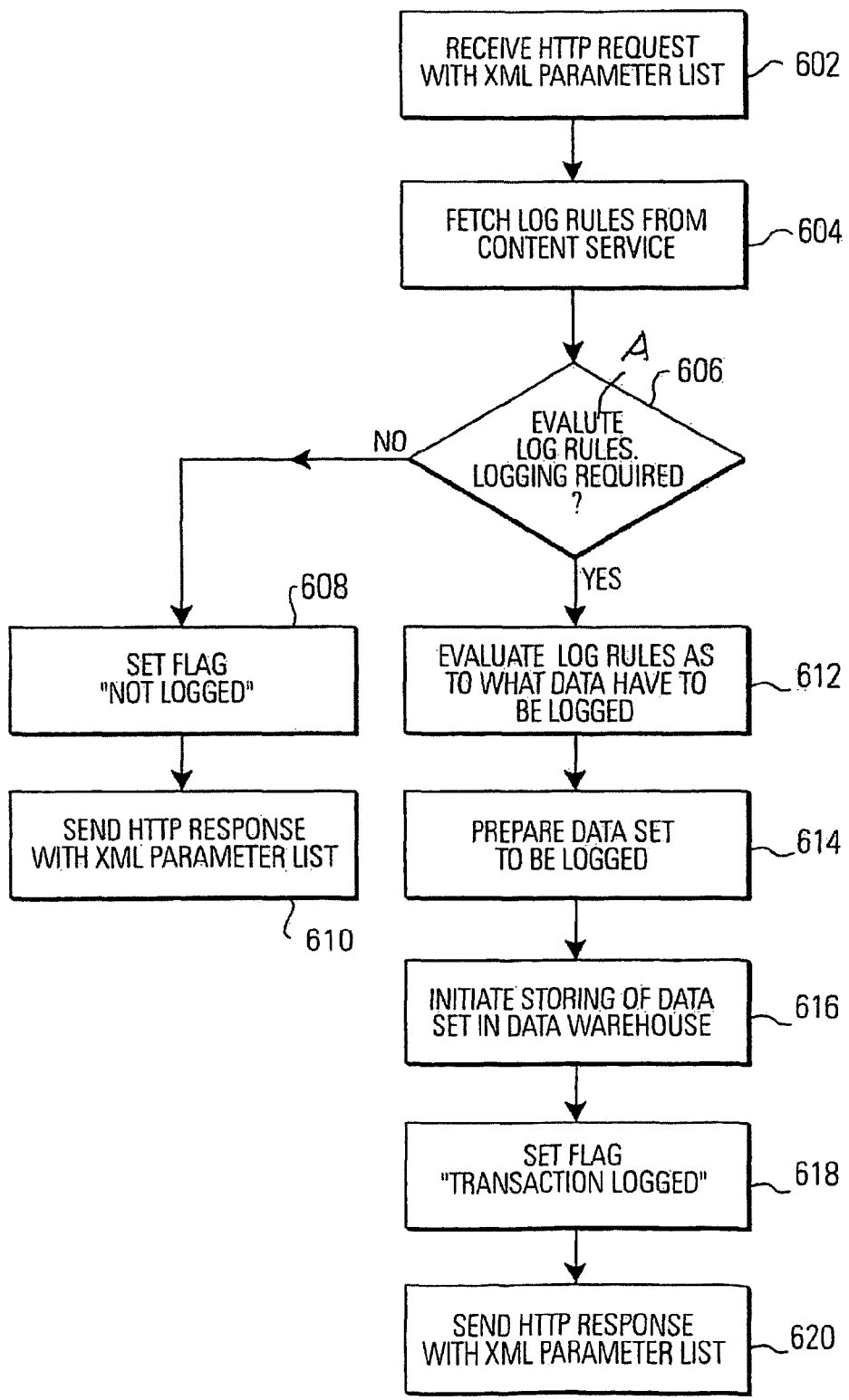

METHODS, DATA RECORD, SOFTWARE INTERFACE, DATA WAREHOUSE MODULE AND SOFTWARE APPLICATION FOR EXCHANGING TRANSACTION-TAX-RELATED DATA

FIELD OF THE INVENTION

The present invention relates generally to computerized transaction-tax processing, and more particularly to computer-based methods, a data record, a software interface, a computer-based data warehouse module and a software application for exchanging transaction-tax-related data.

BACKGROUND OF THE INVENTION

Besides an income tax system which imposes income-related tax liabilities on individuals and corporations, most countries have a transaction tax system. A transaction tax liability is induced by an individual commercial transaction, such as the sale of a good, the purchase of a service or the like. Typically, the transaction tax is a certain percentage of the price of the good or service. Normally, the transaction tax is collected by the vendor or service provider, who pays the accumulated transaction tax at certain time intervals (e.g. monthly) to a tax authority (for the sake of simplicity, the following description only mentions the purchase of goods, but is likewise directed to the provision of services etc.).

Throughout the world, there are, mainly two different transaction tax systems: sales and use tax and value added tax (VAT). In a sales and use tax system, which is imposed in most states throughout the United States, the tax amount is derived by applying the tax rate to the retail sales price of tangible personal property or certain enumerated services. If a product is manufactured and sold in a supply chain, all transactions are non-taxable re-sales until a final retail sale to an end-user, which is taxable unless the end-user can claim an exemption from the tax. Thus, in a sales and use tax system, no tax is applied to a product until sold at retail. In a value added tax system, which is applied in many European countries, in a supply chain the transaction tax in a single individual step corresponds only to a percentage of the value added in this step, i.e. to the difference between the amount of money the vendor receives for the sold product and the taxable amount he had to spend in order to manufacture or provide the good. In such a value added tax system, the amount of transition tax accumulated over all the steps of the supply chain is independent of the number of transactions in the chain, it only depends on the price of the finished product. However, normally the "added value" is not determined in individual transactions. Rather, every vendor accumulates, on the one hand, the tax received from buyers and, on the other hand, the tax he has paid to other vendors for all the transactions occurring within certain time periods (e.g. months) and pays only the difference between these two accumulated values to the tax authority. Therefore, also in a value added tax system, when looking at an individual transaction, the buyer has to pay a certain percentage of the product's price to the vendor.

Besides these principal differences between sales and use tax and value added tax, the transaction tax regulations vary from country to country, and, in the United States, even from state to state down to the level of cities and areas. For example, there are different rates in different countries and even in different states. In addition, the tax rate may depend in a country or state specific way on the seat of the vendor and/or the buyer and/or the origin and/or the destination of the good when it is shipped from the vendor to the buyer. In many countries there is a tax rate of zero for exported goods. However, in trade within the European Community transaction tax has to be paid in the country where the transaction takes place, but is then credited to the destination country in a clearing procedure carried out by the tax authorities. Also the requirements for transaction tax related bookkeeping, reporting and the form and period of tax declarations to the tax authorities generally vary from country to country.

In view of the ever-growing internationalization and globalization of enterprises and trade, there is a need for computerized systems which enable enterprises to fulfill the transaction tax requirements (preferably for different countries and states) in an efficient way.

Several products of this kind are already on the market. In one type of product, an enterprise resource planning (ERP) application (which traditionally provides for accounting, manufacturing logistics, supply-chain management, sales-force automation, customer service and support, human resources management, etc.) also enables the user to deal with the transaction taxes. For example, the ERP product R/3 by SAP provides a facility for transition tax calculation for different European countries, but not for the United States. Another type of product is a specialized application for transaction tax calculation and reporting. Examples of such an application are "TaxWare", "Sabrix", "Vertex" and "Datev".

Moreover, U.S. Pat. No. 6,078,899 discloses a point of sale tax reporting and automatic collection system. U.S. Pat. No. 6,298,333 discloses a computer system and method which provides a solution for a particular transaction tax related problem, namely the determination of correct use tax on moveable equipment for leasing companies.

SUMMARY OF THE INVENTION

The invention provides a computer-based method which is performed in a first transaction-tax-related application. The method comprises exchanging transaction-related data with at least a second transaction-tax-related application according to a standardized transaction-tax interface data model.

According to another aspect, the invention provides a computer-based method which is performed in a first transaction-tax-related data warehouse application. The method comprises storing transaction-related data received from at least one other transaction-tax-related application in a data warehouse according to a standardized transaction-tax data warehouse data model.

According to still another aspect, the invention provides a data record according to a standardized transaction-tax interface data model. The data record comprises transaction-related data items, for the data exchange between transaction-tax-related applications or modules.

According to yet another aspect, the invention provides a software interface stored on a computer-readable storage medium and executable by a computer for linking a first transaction-tax-related application with at least a second transaction-tax-related application. The interface is implemented such that data are exchangeable between the first and the second transaction-tax-related application according to a standardized transaction-tax interface data model.

According to yet another aspect, the invention provides a computer-based data warehouse module. The data warehouse module is configured for storing transaction-related data received from at least one other transaction-tax-related application according to a standardized transaction-tax data warehouse data model.

Finally, the invention is also directed to a transaction-tax-related software application including an interface for linking the application with at least a second transaction-tax-related application. The interface is implemented such that data are exchangeable between the first and the second transaction-tax-related application according to a standardized transaction-tax interface data model.

DESCRIPTION OF THE DRAWINGS

In the accompanying drawings:

FIGS. 4a-4b show an example for the processes executed during a transaction tax calculation and a transaction tax logging;

FIG. 5c shows an exemplary flowchart of the interface shown in FIG. 5a;

FIG. 5d illustrates the flowchart shown in FIG. 5c in more detail;

FIGS. 6a-6h show three tables "Inbound Data elements", "Outbound Data elements" and "Further processing elements" listing different data elements of the standardized data model according to a preferred embodiment of the invention;

FIG. 7 is a flow chart of a method carried out by a transition tax logging service;

DETAILED DESCRIPTION OF THE PREFERRED EMBODIMENTS

Figure 1:
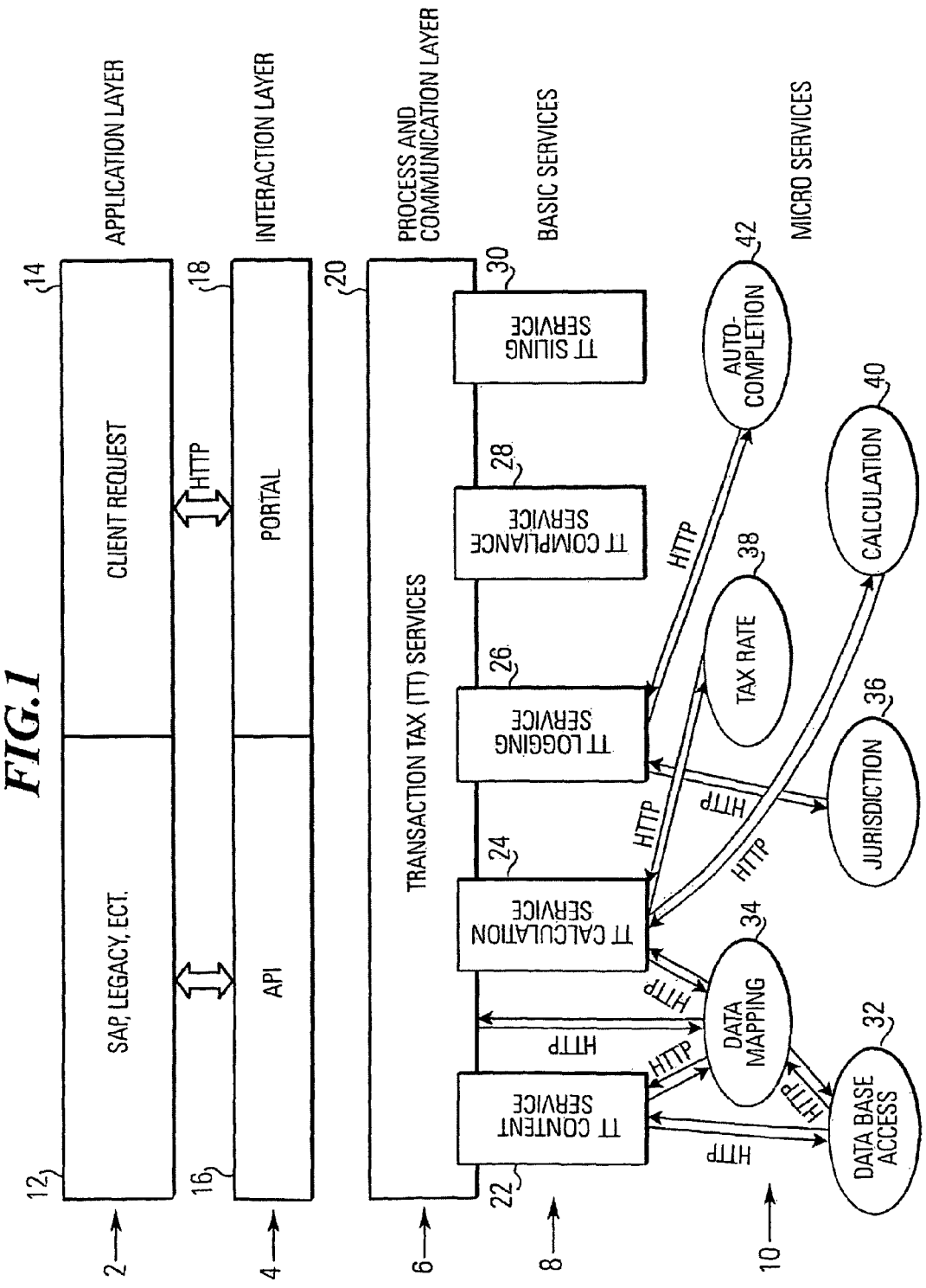
FIG. 1 shows the main components of the transaction tax processing system.

In FIG. 1 the main components and architectural layers of the transaction taxation system are depicted. Before proceeding further with the description, however, a few items will be discussed.

The term transaction tax (TT) and transaction taxation, sometimes also referred to as turnover tax, covers all kind of taxes which apply to commercial transaction processes of a company such as sales or purchases. The taxation regulations for those transactions vary from country to country and may even vary from state to state or district to district in one country. Examples for such transaction taxes are the sales and use taxes applied in the United States or the value-added tax used in most European countries.

The general requirements for a transaction tax processing system are the capability of calculating the transaction tax taking into account the country-specific requirements for national and transnational transactions, the reporting and storing of the tax-related data for auditors information or company-internal use and the filing of the tax report to the appropriate tax authority.

Transactions within a company which might be subject to a transaction taxation comprise orders, financial credits, quotations and bids, incoming or outgoing invoices, returns and credits, or internal financial transactions between business units of the same company belonging to different legal or taxation systems.

According to a preferred embodiment of the invention a first transaction-tax-related application exchanges transaction-related data with at least a second transaction-tax-related application according to a standardized transaction-tax interface data model. The term transaction-tax-related application covers all applications which involve transaction taxation in the broadest sense. Those applications use an data model either for internal computations or for external communication which is referred to as application-specific data model. Thereby, the data model either used for internal computations or at least used for external communication might already be identical to the standardized transaction-tax interface data model. However, the normal situation will be that the application-specific data model differs from the standardized transaction-tax interface data model. Then, the first transaction-tax-related application preferably maps its data according to its application-specific data model to data according to the standardized transaction-tax interface model. Again, depending on the specific data model the second application is using (which might be different to or identical to the standardized transaction-tax interface model), preferably a further mapping might be required of data elements which are exchanged according to the standardized transaction-tax interface model to the data elements of the second application-specific data model. Thereby, the two different application might preferably each use a different application-specific data model whereas they communicate with each other according to the standardized transaction-tax interface data model. Naturally, if the two applications have to communicate with each other in both directions the two mapping requirements will occur in both directions. Otherwise, the two mapping requirements will occur only in one direction (for example, a particular application only invokes the other one without demanding the return of any transaction-tax related data elements or the like, e.g. the specific logging service described below may only log certain data without returning any data to the invoking application).

Thereby, the particular transaction-tax-related data items exchanged between the different applications (as well as between different transaction taxation services and between an application and a particular transaction taxation service, see below) are grouped within a data record which is configured according to the standardized transaction-tax interface data model. The term data record covers the grouping of one or more data items either in a data record of fixed length or more preferably in a data record of flexible length. In the latter case the data record may preferably be exchanged as an argument when a transaction-tax-related application or module is invoked. More preferably, when the application (or transaction taxation service) is invoked by an HTTP (Hypertext Transfer Protocol) request, the exchanged argument is an XML (Extensible Markup Language) document forming a part of the HTTP request. The transaction-tax interface data model is preferably defined so as to provide data elements at least for a first jurisdiction and a second jurisdiction, wherein the transaction-tax interface data model has at least one first data element which used for the first jurisdiction, but is not used for the second jurisdiction, and at least one second data element which used for the second jurisdiction, but is not used for the first jurisdiction. For example, different jurisdictions of different countries might require different data items (information about the particular transaction-tax-related transaction) for calculating the transaction tax involved in that particular transaction (e.g. specifically for the United States, the reason for an exemption from transaction tax should be indicated). Another example concerns the definition of what data of a transition have to be logged. This differs from jurisdiction to jurisdiction and may depend on the company's legal type. For example, within Europe, Spain requires a more comprehensive recording of transaction data than Germany. Furthermore, different companies might have different interests in exchanging transaction-tax-related data for business-management analysis purposes. Therefore, the standardized transaction-tax interface data model might also comprise data elements which cover these particular company-specific, requirements. For example, individual companies may wish to log more detailed transaction data than the minimum requirement of compliance reporting. Naturally, the standardized transaction-tax interface data model might also comprise data elements which are not yet mentioned in this specification.

According to a further preferred embodiment, the invention is directed to a computer-based method performed in a first transaction-tax-related data warehouse application. The method comprises storing transaction-related data received from at least one other transaction-tax-related application in a data warehouse according to a standardized transaction-tax data warehouse data model. Preferably, the method comprises exchanging transaction-related data stored or to be stored in the data warehouse with the other transaction-tax-related application according to the standardized transaction-tax interface data model. Thereby, the tax-related data warehouse data model has a set of transaction-tax-related data elements and the standardized transaction-tax interface data model has a set of transaction-tax-related data elements. The set of transaction-tax-related data elements of the tax-related data warehouse data model preferably comprises, equals or is a subset of the set of transaction-tax-related data elements of standardized transaction-tax interface data model.

Usually, the transactions which are subject to transaction taxation are processed within a business application, or more particularly, within an enterprise resource planning (ERP) application such as the product R/3 by SAP. Therefore, the transaction system has to be linked to those business pr ERP applications, i.e. an appropriate interface has to be provided. Alternatively, the execution of the transaction tax processing system may be initiated via the Internet. For example, an e-business portal is provided in the Internet offering a service for transaction tax calculation. In the first case, the connection between the business application and the transaction tax processing system is realized as an Application Programming Interface (API), while in the second case the execution of the transaction tax processing system may be triggered by a client request transmitted via Internet using the HTTP protocol. In, both cases, there is usually no standardized data model for the exchange of parameters with the transaction tax processing system, i.e. the transaction tax processing system needs to be able to handle various data formats and models.

The Hypertext Transfer Protocol (HTTP) is the protocol used in the preferred embodiments for communication between the different software modules of the transaction tax processing system, and in particular, between the basic services and micro services. The HTTP protocol is the standard communication protocol used in the World Wide Web (WWW), which is referred to as the Web. However, other future Web protocols or other versions of the HTTP protocol may be used in the preferred embodiments.

Various data types may be used for the exchange of information between different Web servers. In the preferred embodiments, the Extensible Markup Language (XML) is used as Web-based technology for the interface between the different software modules of the transaction tax processing system (that are possibly geographically delocalized) in order to exchange the necessary parameters. This technology allows a flexible design of data models. Each data element of the data model comprises an identifier, which can be freely defined in the so-called Document Type Definition (DTD), and a corresponding value. In contrast to HTML (Hypertext Mark-up Language), in which the data types are restricted to a given set of data types, an XML programmer can define his own data elements according to the specific needs of the application. Typically, in XML a data element is transferred via the Web using the syntax:

<parameter_name id="id_name">parameter_value</parameter_name> where the data element "parameter_name", which is sometimes referred to as "tag", is identified by its ID and carries the value "parameter_value". In this way, parameters can be passed from one software module of the transaction tax processing system to another via the Web. The data structure of XML documents can be defined by means of a Document Type Definition (DTD) or an "XML-Schema". The use of XML with an "XML-Schema" as Web-based interface technology for the transaction tax processing system has the advantage of being more flexible in the definition of more complex data structures.

The term exchange of data relates to a software interface that transfers data from one application or software module to another. However, the term exchange does not imply a transfer of data in both directions and thus is not restricted thereto, but particularly comprises a transfer of data only in one direction.

The term data record relates to an instance or embodiment of a data model e.g. a data set or file transmitted via the Internet, stored on a hard disc, CD, disc, or DVD, etc. Such a record comprises a number of data items corresponding to the data elements of a data model.

Now coming back to FIG. 1, which depicts the different layers of the architecture of the transaction tax processing system of the preferred embodiments. The application layer 2 comprises the software or the event which initiates the execution of the transaction tax processing system. Basically, there are two possible ways to call the transaction tax processing system. In one of these, a business application program 12, such as an enterprise resource planning (ERP) application like SAP R/3 or legacy, demands transaction tax (TT) services 20 via an application programming interface (API) 16. The ERP 12 processes and stores the transaction-related data and passes the relevant parameters over the interaction layer 4, i.e. the API 16, to the process and communication layer 6 of the transaction tax processing system. In the second way, a client requests transaction taxation services 20 via a Web portal 18 using the HTTP protocol. Two general embodiments of such a portal are possible. In one embodiment, the portal 18 offers a service via a Web page on which the user may specify certain transaction parameters, e.g. the purchased product, the price, the production location, the shipment location etc., and requests interactively a corresponding transaction tax calculation from the transaction tax processing system. The clients does not need to know anything about the taxation rates, the jurisdiction and regulations in the specific production and shipping countries nor to know about recent changes. The client gets back the accurate tax value and taxation rate for the specified transaction. There is also the possibility for the client to retrieve general information on taxation rates and regulations for various countries using the Web portal 18.

Another way to use the Web portal 18 would be by connecting the Web portal 18 automatically via a HTTP connection to a client application which might be an e-business application requiring some kind of transaction tax calculation. This client e-business application 14 then requests transaction tax calculations from the transaction tax processing system via the portal 18 automatically during its execution.

The main functionality of the transaction tax system is implemented via basic services 8 and micro services 10. A basic service 8 usually aggregates a number of micro services 10. However, micro services 10 can also be called as stand alone modules.

In the process and communication layer 6 specific processes for the specific client requests are defined. For each specific request a certain workflow has to be performed which is controlled by the process and communication layer 6. It controls the calls of the various basic and micro services 8 and 10 and provides the communication between those services.

This layer is based on the HP (Hewlett Packard) e-speak technology which integrates the various basic and micro services. Based on a set of micro services 10 the basic services 8 are used in combination or stand alone within the various process steps of the transaction tax services 20.

The architecture is a true Web-based architecture using Web technology. The communication between the process and communication layer 6 and the basic services 8 as well as the micro services 10 is based on Web technology such as HTTP using XML for exchanging parameters. Moreover, the same Web technology is used for communication between the basic services 8 and between the micro services 10 as well as for communication of these services 8 and 10 with each other. This standardized interface purely using Web technology allows an easy integration of new basic or micro services into the system and a complete delocalization of those basic and micro services without the need to introduce further network communication technology.

The transaction tax services 20 comprise and control a number of basic services 8. The content service 22 is the database containing the specific jurisdiction and rules for the various countries as well as the various tax rates and other information needed to comply with the country-specific requirements. The TT calculation service 24 provides the basic functionality of calculating the transaction tax for a specific transaction. The TT logging service 26 decides which transactions and which content of the transactions should be logged for further reporting, that is which kind of data are needed for further analysis, auditing or reporting. The TT compliance service 28 automatically processes the logged information in a way which is suitable for a consecutive auditing. The TT filing service 30 finally is able to automatically fill out the appropriate tax forms and reports and file it electronically to the appropriate tax authority.

In the preferred embodiments these basic services 8 make use of many other micro services 10 such as a service 32 for managing the data base access, a micro service 34 for mapping the data between the data models and formats of the different applications, a micro service 36 for determining the specific jurisdiction, a micro service 38 for retrieving the correct tax rate for a specific transaction, a micro service 40 for carrying out elementary tax related calculations, or a micro service 42 for auto-completing incomplete data sets.

Figure 2:
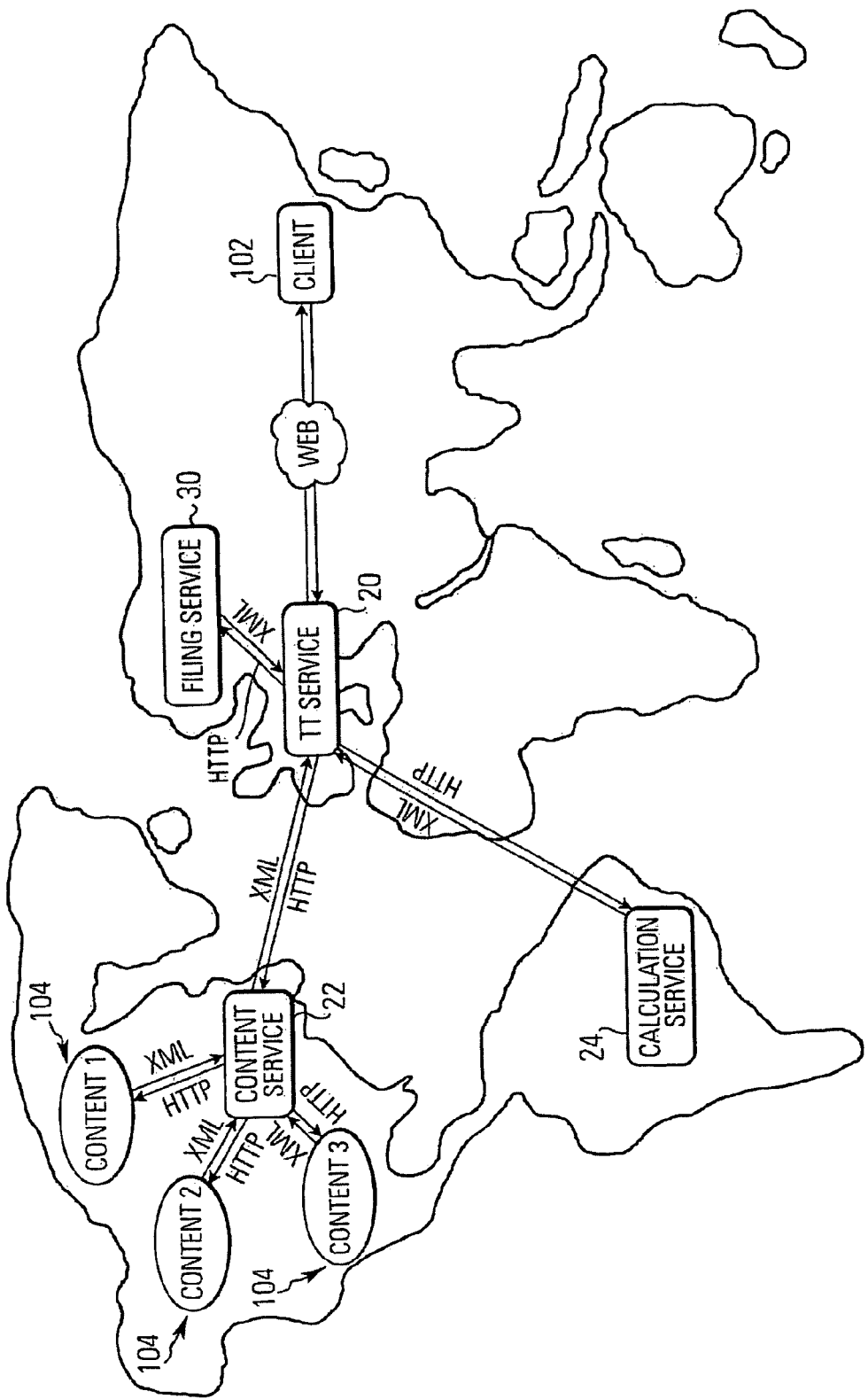
FIG. 2 schematically depicts the delocalization of the major components of the transaction tax processing system and its connections to each other.

FIG. 2 visualizes schematically an example for a possible geographical delocalization of the various services which are part of the TT service 20. Due to the differences in transaction taxation jurisdiction in the different countries, an international company usually comprises local transaction tax processing systems which are adapted to the specific requirements of a certain country and cannot be integrated in and communicate with the other transaction tax processing systems of the company. In contrast thereto, the preferred embodiments of the transaction tax processing system allows the integration of the local transaction tax systems into one system by using. Web technology for the communication between the various software modules. Moreover, a standardized data model is used within all basic services and micro services facilitating the interface between two interacting services. A Web technology used in the preferred embodiments is the HTTP protocol using XML for passing the parameters from one service to the other.

In the example shown in FIG. 2, a client 102 located in Asia requests the transaction tax service 20 in Europe via the Internet. This TT service 20 controls the required process by calling other basic services such as the calculation service 24, the content service 22 and the filing service 30 which are located in different countries. Due to the Web-based technology of the communication between the services, the geographical proximity of the services is no longer necessary. Thus, the location of the filing service is located in the country of the appropriate tax authority, the location of the calculation service is chosen according to other criteria like the cheapest hardware infrastructure or the location of a third party provider, while the various content services 104 are distributed geographically across various countries according to the location of the experts in the different countries.

Figure 3:
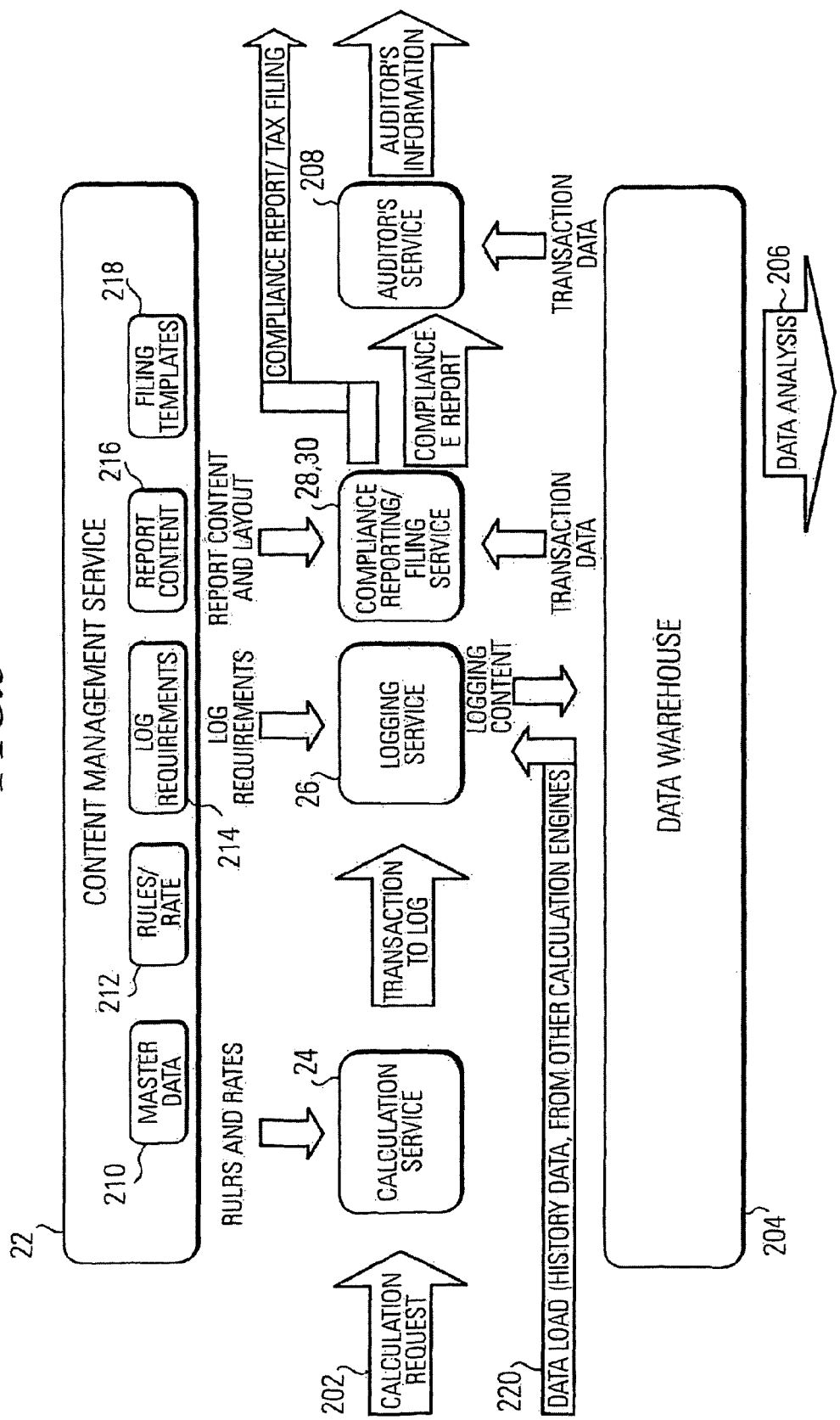
FIG. 3 illustrates the various processes performed by the transaction tax processing system.

In FIG. 3 the principal process of a transaction tax calculation of the preferred embodiments is schematically depicted. Not all basic services are executed for any calculation request as the exact process varies depending on the specific calculation request 202. The definition of a specific process and the control of the order of execution of the various services and their communication with each other is performed by the process and communication layer 6 of FIG. 1.

In the preferred embodiments a calculation request 202, e.g. from an external business application, initiates the transaction tax calculation. The calculation service 24 then calculates the transaction tax on the basis of the parameters received from the calculation request 202. For this purpose, the calculation service 24 demands data from the content service 22, and in particular from its component 212 containing rules and rates and its component 210 containing the master data. The master data 210 is a centralized data base containing for example company information of a registered client, i.e. the company for which the transaction tax is calculated. Such company information for example can be the legal structure of the company which influences the type of tax calculation.

In the preferred embodiments, the content services 22 basically has the function of an interface used by tax experts for inputting, defining and maintaining the taxation rules and rates, as well as the logging and filing requirements. In particular, the components 210, 212, 214, 216 and 218 represent not only rules, data and templates, but also configuration interfaces which enable the user to input and configure these rules, data and templates.

For the parameter transfer between a calling business application and the transaction tax processing system a standardized interface data model called a tax object (T-object) is used. This standardized tax object allows a flexible link of different business applications to the transaction tax processing system. In one preferred embodiment, the same data model (T-object) is, used for the internal data exchange yielding a high degree of modularization and flexibility for the integration of new modules in the existing system. In addition, in the preferred embodiments the rules requested for a specific transaction tax calculation are transmitted from the content service 22 to the calculation service 24 via an additional meta data model.

In the preferred embodiment according to FIG. 3, the calculation service 24 passes its results to the logging service 26 via a Web-based standardized interface using the T-object data model. The logging service 26 is able to retrieve logging requirements 214 from a specific section of the content service 22. This service allows the user to define what kind of transactions are to be logged and what data elements are needed as well as automatically recognizing the transactions which have to be logged. The logging requirements reflects tax jurisdictional requirements as well as special regulations of a certain client. They are defined in the form of rules. Thus, the logging service 26 automatically determines the content which has to be logged and writes the result to the data warehouse 204. In the preferred embodiments, also data from other tax calculation engines and history data 220 can be loaded to the logging service 26.

Like the other communication connections between the basic services and micro services, the interface between the logging service and the data warehouse is realized in XML on a HTTP connection. While the exchange and transfer of internal data within the transaction taxation service and possible to external business applications is based on the T-object data model, the content of the data warehouse 204 is stored using a different data model, a so-called data warehouse data model. Usually, the requirements for these two data models differ for various reasons, for example because of legal or auditors requirements, internal software specific requirements or requirements of other external business applications that work together with these data models. Therefore, these two data models do not have to be necessarily identical. Either some data elements of the data warehouse data model may not be part of the T-object data model, or vice versa. Additionally, the data warehouse data model may be a subset of the T-object data model, or vice versa.

The logging service 26 additionally ensures that the logged data satisfy the local authority's needs. Furthermore, the calling business applications no longer need to know which transactions have to be logged e.g. for the auditor's report or for which transactions a transaction tax calculation has to be performed, as this is automatically recognized by the logging service. The logging service thus guarantees the availability of all transaction data needed for compliance reporting and tax filing also in the case that the transaction tax has not been calculated within the transaction tax processing system but by an external transaction calculation engine. If data to be logged are incomplete, the logging service can use the auto-completion micro service 42 to ensure that the logged data are complete.

The data warehouse 204 represents the database for the compliance reporting and filing service 28, 30.

The compliance service 28 retrieves the report content from section 216 of the content service 22 and produces the compliance report for the auditors. If information is missing for the auditors report, the compliance service 28 can call the auto-completion micro service 42 to complete such missing information automatically in the preferred embodiments.

Similar to the compliance service 28, the filing service 30 relies on the transaction data from the data warehouse 204 to fill out the specific tax filing forms required for a certain transaction. As for the compliance reporting, the filing service 30 is able to complete missing information automatically using the auto-completion micro service 42 in the preferred embodiments. The necessary tax filing form templates 218 are defined and stored in the content service 22 and serve as a database for the filing service 30. Based on meta data from the content service 22, the filing service 30 determines what transactions need to be filed and creates the respective information needed for the filing. The completed tax forms can then be filed electronically or as hard copy with the local tax authority according to the respective governmental requirements which are as well retrieved from the content service 22.

In the preferred embodiments, an auditors service 208 is provided which retrieves via a Web-based connection technology information from the compliance report and transaction data from the data warehouse 204 in order to provide information for the auditing.

The data analysis interface, 206 provides an access to the central transaction database contained in the data warehouse 204 for other internal or external tools. Such tools may be data mining or other analysis tools for business relevant formation. It can also be used for tax optimization purposes for example by simulating required transaction taxes for a special supply chain, scenario.

Figure 4B:
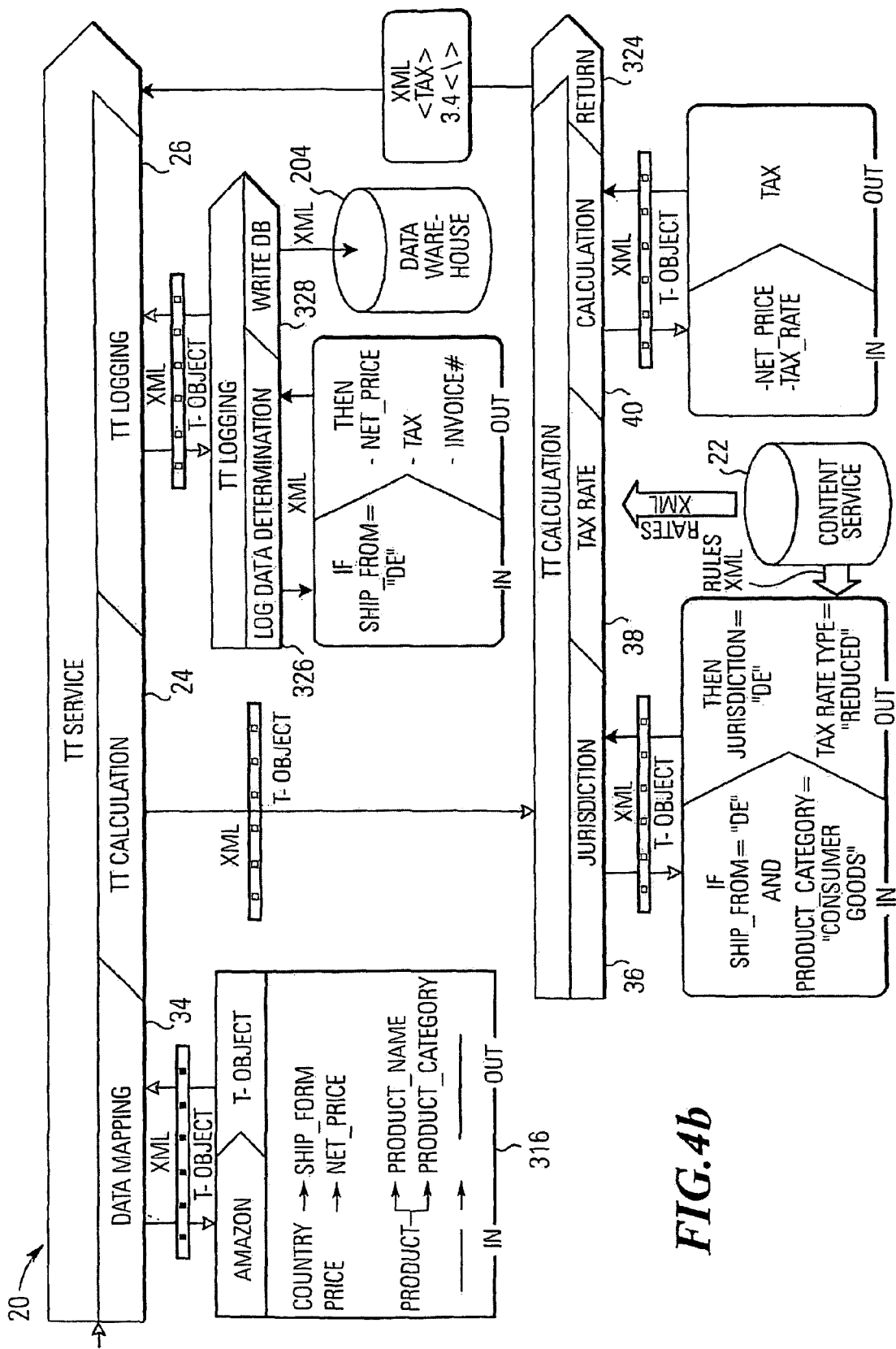

In FIGS. 4a and 4b, a concrete example for a transaction tax calculation according to the preferred embodiments is given. This example is a simplified representation of a specific transaction tax service. Usually, a transaction tax service comprises additional and more complex micro services which have been omitted here for the sake comprehensibility.

Assuming, that a third party orders a book for the price of 40 Euros via the Amazon Web page 302 and pays the price of the book by credit card transmission. In response to this selling event, Amazon requests a transaction tax calculation 304 by a transaction taxation service 20 demanding the calculation of the tax for this specific transaction using the HTTP request 34. The data related to this specific transaction are passed to the transaction taxation service 20 using XML. In this Web-based technology, a list of parameters 306 for this specific transaction of selling a book comprising for example the parameters invoice number, country, price, product and requested kind of service is transferred encoded in XML to the TT service 20 via a HTTP POST request. For each parameter a XML tag is defined containing the corresponding parameter value.

In this specific case the first micro service called by the TT service 20 is the "data mapping" 34 as shown in FIG. 4b. The micro service "data mapping" 34 implements the interface between the XML parameter list and the T-object, which is the standardized data model of the TT service 20 by converting in step 316, the Amazon parameter list into the data elements of the T-object. During this mapping it might occur that there is no one-to-one mapping between both parameter sets so that some logic has to be applied in order to fill those data elements of the T-object which have no direct counterpart. For example, the Amazon parameter product carrying the value "book" is mapped to a data element "product_name" and "product_category" of the T-object. The data element "product_category" may for example serve to distinguish between consumer goods or capital goods.

The following basic service "TT calculation" 24 called by the TT service 20 is composed of several micro services 36, 38, 40 and 324. First, the TT calculation 24 needs to define the appropriate jurisdiction to be applied using the corresponding micro service 36 to which the necessary parameters are passed via the T-object data model using the Web-based technology XML. The content service 22 provides the rules in the form of an additional meta data model for the determination of the specific jurisdiction to be applied. The "jurisdiction"

micro service 36 in this case in which the "ship_from" parameter is "DE" (which stands for Germany) and the "product_category" is "consumer goods" determines the appropriate jurisdiction to be Germany coded as "DE" and the tax rate type to be "reduced" which are the output parameter of this specific micro service 36.

The micro-service "tax rate" 38 retrieves the specific tax rate for this, case from the content service 22 using an additional meta data model in which the data are also transferred using Web-based technology and XML. Finally, the micro service "calculation" 40 performs the concrete calculation of the required tax for this transaction based on the T-object data elements "net_price" and "tax_rate". The output parameter of this micro service 40, the tax amount, is then returned to the TT service 20 using the "return" micro-service 324 again by using XML for the data transfer.

As in this special example the requested TT services from Amazon are a transaction tax calculation and a logging service, the basic service "TT logging" 26 is called next from the TT service 20. Again by using XML and handling the data over to the micro services 326 and 328 in the form of the T-object the micro-service, "log data determination" 326 determines what data have to be logged for this specific transaction. Based on the T-object element "ship_from", the micro service 326 returns in this example the net price, the absolute tax and the invoice number to be the data elements which have to be logged. Using yet another micro service "Write DB"328, the determined logging data are written to the data warehouse 204.

Referring to FIGS. 5a-e, 6a-6h, and 7, more details are provided of the specific interface linking external applications to the basic and micro services as described in the above figures as well as linking the these services with each other. As mentioned above, an external application might use a basic or a micro service, for example the TT calculation service 24, or one basic or micro service might use another one. Proper communication between the invoking application or service and the invoked service will be ensured by the corresponding interface which has to furnish all the data required, on the one hand, for establishing a communication between the invoking service/application and the invoked service and, on the other hand, for enabling the invoked service to perform its proper function.

Reference is made to the above Amazon example given in conjunction with FIGS. 4a and b. As already mentioned therewith, the interface (realized inter alia by the data mapping micro service 34) is used for mapping the parameters delivered in the Amazon request into the data format and model internally used by the TT calculation system 24. If numerous different external applications all having different output parameters (data elements "net price", "tax rate", etc.) used the basic and micro services, a corresponding number of different data mapping micro services would have to be invoked by the TT calculation service 24 for proper communication with these applications. This, however would imply a considerable data mapping effort at the TT calculation service side.

Hence, according to a preferred embodiment of the invention, the data model used for communication between external applications, and basic and micro services as well as between different basic and micro services (it should be noted that some basic or micro services may be externally provided and might possibly use a different data model than the internally provided basic and micro services), is standardized. It will hereinafter be referred to as tax object. The use of a standardized data model advantageously eliminates the need for complicated interface structures since now each interface only needs to implement a data mapping of the internally used data model to the standardized data model and vice versa. In other words, each service only receives data implemented in the standardized data model object irrespective of the application sending these data and, in turn, delivers only data in the standardized data model to any other application/service.

Returning to the specific model depicted in FIG. 1, any external application invoking sequentially or in parallel several of the basic or micro services, for example first of all the TT calculation service 24, then the TT logging, service, 26 and finally the TT filing service 30, needs only one mapping module at the application side for mapping its application-specific data elements to the respective data elements in the standardized data model irrespective of the specific invoked basic service. Moreover, if the respective invoked service internally uses the standardized data model no further mapping will be required at the service side. In practice, however, it might be further necessary to transmit some additional data not yet provided in the standardized data model, for example for controlling the communication between the invoking and the invoked application/service. This will often be the case for the different basic and micro services described with regard to FIGS. 1 to 4 when communicating with each other. In view of the numerous communications in the overall set of links between external applications and internal services a data model comprising data in the standardized data model as well as individual data will be preferred wherein the individual data are necessary for the particular communication between a particular pair of applications/services. These individual data might consequently require an individual mapping at the interfaces on the application and the service side. An overall standardized data model also covering all these individual data elements seems to be less preferred since, depending on the way data is exchanged, the transfer of a large amount of data may be required.

In a preferred embodiment, the interface at the service side might comprise a mapping module 34, as shown in FIG. 4b, realized in the form of a micro-service within the structure of the TT services 20. This mapping module 34 will be invoked by the process and communication layer 6 of the TT, services 20 upon receipt of a tax calculation request (or any other request, calling one of the basic or micro-services) wherein such an external request comprises the application-specific data elements. The mapping module then serves to convert the application-specific data elements into the standardized data model which will be used by most or all of the basic or micro services invoked by the process and communication layer 6 in connection with the particular external request, for example the external tax calculation request. As described with regard to the TT services 22 to 40 as shown in FIG. 1 most of the basic services invoke a couple of micro services. Hence, the communication between these micro services and the invoking basic service uses the standardized data model advantageously omitting further mapping procedures.

In another preferred embodiment, the mapping of the application-specific data elements into the standardized data model might alternatively take place at the external application interface advantageously pre-empting the need to invoke the data mapping 34 at the TT services side. Naturally, even in the latter case such a data mapping 34 at the TT services side will be required if any ones of the micro or basic services internally uses a different data model. In this case, the data mapping 34 comprises a mapping from the standardized data model into the internally used data model and vice versa when invoking this particular micro or basic service.

A preferred embodiment for an interface structure will now be described with respect to FIGS. 5a-e wherein one part of the interface is implemented at the TT services side 20 and the other part is implemented in the form of an external interface at the application side.

Figure 5A:
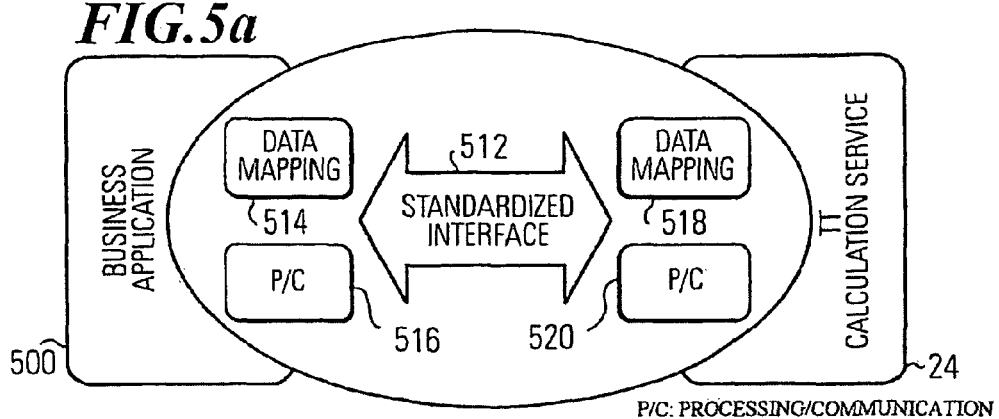
FIG. 5a shows a simplified diagram of an interface used between an external application and a transaction taxation processing service.

FIG. 5*a* shows a simplified schematic diagram of such an interface used between an external application and the TT services 20. In FIG. 5*a*, reference number 500 designates an external business application a part of which is described in FIG. 5*b*. In the particular example shown in FIG. 5*b* the business application comprises a sales order module performing inter alia the steps shown in this figure. In a first step 502, a sales order is created, which is followed by a second step 504 in which item data (material number, quantity, etc.) are added. In a subsequent step 506, a pricing for the item is performed which requires the addition of the specific tax calculated for this item. In order to complete the tax calculation, in a subsequent step 508, the TT calculation service 24 is invoked via an HTTP request delivering the specific data elements necessary for the tax calculation. The TT calculation service 24 calculates the tax and returns the calculated value to the business application which transfers the calculated tax back to the pricing in, a step 510.

As can be seen from FIG. 5*a*, the communication between the business application 500 and the TT calculation service 24 is performed via a transaction tax standardized interface 512 using a standardized data model, namely the tax object (see below). The interface 512 requires a data mapping 514 and a processing/communication 516 on the business application side and a data mapping 518 and processing/communication 520 at the TT calculation service side (for example performed inter alia by the data mapping micro service 34).

The interface processing 516 and 520 on either side provides error handling (checking for erroneously transmitted or missing data, interface errors, tax engine errors, etc.), a specific calculation request handling (a credit/return, reference to former invoice, etc.), transaction type (sale, purchase), exemption processing, audit file processing, number of records, exemption certificate determination, document summary, etc.) and a special processing (line item/end of invoice, etc.). The particular data mappings 514 and 518 will be discussed in detail with reference to FIGS. 6*a*-6*h* below.

Figure 5B:
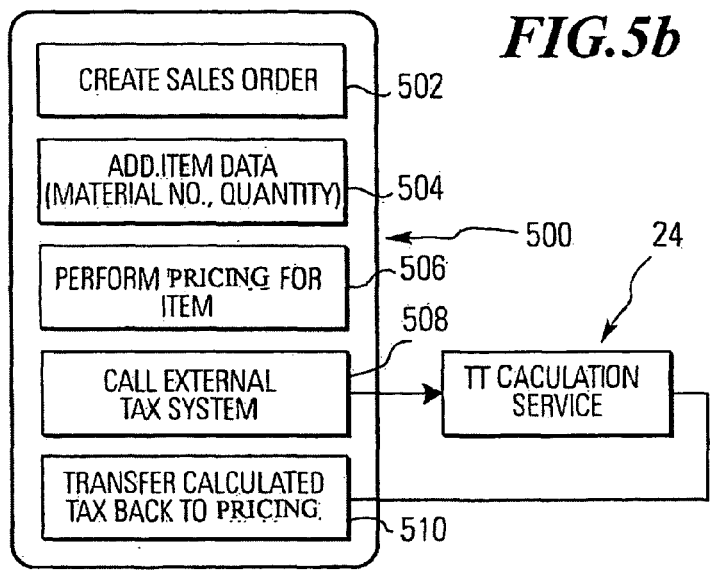
FIG. 5b shows an exemplary flowchart of an external sales order module invoking a transaction taxation processing service.
Figure 5C:
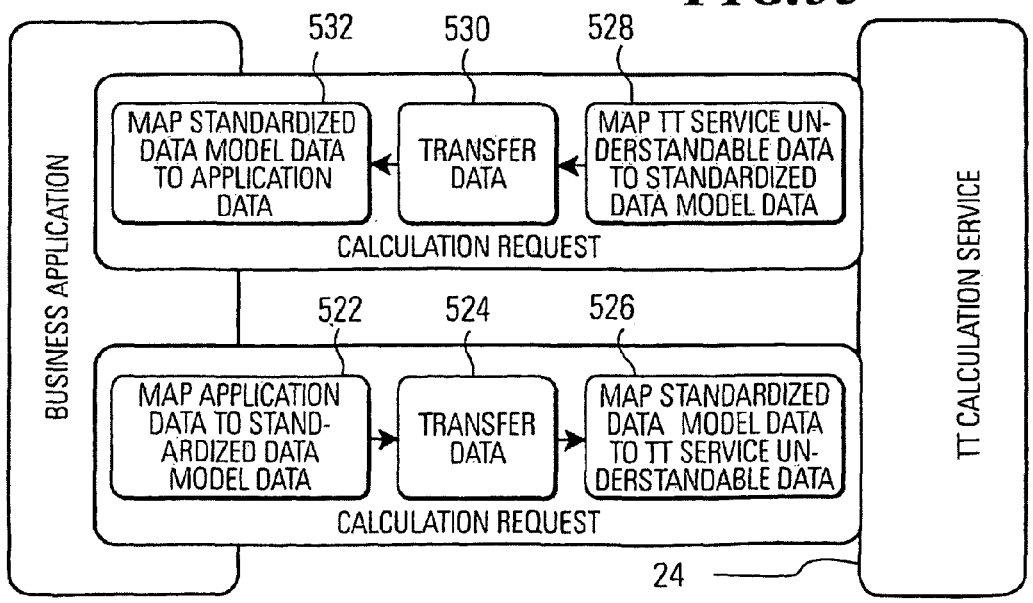

FIG. 5*c* shows a simplified diagram illustrating steps performed by the interface 512 between the business application 500, and the TT calculation service 24. Invoking the TT calculation service 24 in step 508 in FIG. 5*b* comprises mapping of data according to the application-specific data model to data of the standardized data model in step 522, transferring the mapped data in step 524 and mapping the transferred data to service understandable data in step 526, for example, to the particular program code used by the TT calculation service 24. On the other hand, returning the calculation result of the TT calculation service 24 to the application 500 comprises mapping of the service understandable data to data according to the standardized data model in step 528, transferring the mapped data via the Internet in step 530 and mapping the transferred data into the application data, i.e. the particular parameters used in step 510 of FIG. 5*b*, in step 532. Besides, the interface architecture is configured to deal with single data items as well as with a set of data items grouped to a data record.

Reference is now made to FIG. 5*d* illustrating the steps shown in FIG. 5*c* in more detail. Similar reference numbers in FIGS. 5*c* and 5*d* designate similar method steps. As can be seen from FIG. 5*d*, the mapping step 522 performed at the business application side comprises a step 532 for reading an output mapping definition, a step 534 for deriving source information based on the read mapping definition, a step 536 of mapping the source information to the tax object and a step 538 for configuring the mapping definition and delivering the same to step 532 upon request. The data transfer step 524 comprises a step 540 for calling the TT calculation service 24 (performed for example via the HTTP protocol) and a step 542 for retrieving the tax object and the calculation request. The mapping step 526 comprises reading an input mapping definition from a mapping configuration routine 546, and a step 548 of mapping the tax object to the target information. The target information is then delivered to the TT calculation service 24 which returns the calculated tax rate. The returned tax rate is mapped to the target object in step 528. Thereby, step 528 comprises the step 550 of reading an output mapping definition which is again delivered from the mapping configuration routine 546 and a step 552 of mapping the target information (the calculated tax rate received from the TT calculation service 24) to the tax object. The tax, object is then transferred in step 530 to the business application 500 which comprises a step 554 of sending the tax object as a calculation result on the TT services side 20 and a step 556 of retrieving the tax object and the calculation result on the business application side. Besides, the mapping steps 526 and 528 may be omitted if the TT calculation service 24 uses the standardized data model as internal data model. In this case a simple conversion of the tax object in form of a Web-transferable document (specific object in an HTTP request, etc.) into machine-readable program code will be required. However, in this case it might be further required to merely convert technical data elements used for the technical implementation of the interface which can be done in steps 540, 542, 554 and 556. These technical data elements preferably do not form part of the tax object. The retrieved tax object is transmitted to the mapping step 532 which comprises a step 558 of reading an input mapping definition delivered from the mapping configuration routine 538, a step 560 of mapping the tax object to the source information and a step 562 of deriving a source information based on the mapping definition. The result of step 562, namely parameters or a set of parameters understandable by the business application 500 is then transferred to step 510 shown in FIG. 5*b* and used for further calculations within the business application 500.

In steps 538 and 546, the set of mapping rules might be preferably implemented in the form of two tables, the first one containing header data and the second one containing item data. A rule consists of a header table record and n item table records, wherein n is equal to 1 or an integer greater than one. The two tables might be accessible by a transaction in order to externally configure the rules within these tables (rule definitions might be created via a transaction table maintenance). In other words, the rules are configurable by external access. A rule definition will be entered into the rule header and the rule item table in form of records having the structure as shown in the following diagram:

| Rule Header Table | | Rule Item Table |
|---|---|---|
| Rule No | → | Rule No |
| Rule Type | | Pos No |
| Dst Field | | Src Table |
| Dst Offset | | Src Field |
| Dest Length | | Src Offset |
| Description | | | wherein corresponding records in the rule header and the rule item table which establish a specific rule (as indicated by the arrow in the above table) are defined via identical entries in the "Rule No" field (several records in the rule item table might have the same rule number meaning that they form a complex rule). Hereby, the "Rule Type" field indicates the particular mapping type selected from the group consisting of static mapping (S), constant mapping (C) and, dynamic value lookup (D) (see below). The "Dst Field" field designates the particular destination field. The "Dst Offset" field designates an offset of the destination field, the "Dst length" field a length of the destination field and the "Description" field enables the user to enter a particular comment to the underlying rule (only optionally provided). The "Pos No" field in the rule item table is a counter for the record number in the rule item table belonging to a single rule (a record in the rule header table having a specific rule number might correspond to several records in the rule item table having the same rule number). The "Src Table" and "Src Field" fields define a source table and a source field, respectively. The "Src Offset" field designates an offset of the source field.

A first preferred mapping type, the so called static mapping, comprises assigning the value of a certain source field to a certain destination field.

A further preferred mapping type, the so called constant mapping, comprises assigning a fixed value to a certain field in the destination structure.

Another preferred mapping type for complex mapping situations, the so called dynamic mapping, comprises assigning the mapping result of a mapping function to the destination field wherein the mapping function is based on rules and is given in the form:

destination_field=mapping_function(source_field_1, source_field_2, . . . )

Thereby, the values of the source fields "source_field1", "source_field2", etc. are the input parameters of a specific mapping function which outputs its mapping result to the field "destination_field".

In a preferred embodiment of the present invention, the mapping function is defined via a lookup table (together with the two above mentioned tables) having as its contents the source information of the different source fields and the corresponding mapping result, for each rule. More particularly, the lookup table preferably contains generic keys for each rule. The generic keys are formed by concatenating the contents of all source fields of a rule. For each rule, the lookup table contains an entry for a generic key and a corresponding mapping result. Hence, the mapping result for the generated generic key is read from the lookup table and moved to the destination field of, the rule (as indicated by the corresponding record in the header data table, cp. above).

It will be appreciated that the static and constant mapping via the specific tables as described above and the dynamic mapping via the specific lookup table as described above is only one possibility for implementing mapping rules within the mapping configuration routines 538 and 546. Another very intuitive implementation for these routines consists of establishing rules via a user definable rule definition interpreter. Those rules may be defined in a particular rule based language (for example Jnana™, Lisp, Prolog, etc.) which provides for a very intuitive user/machine-interface. Entering such rules into the mapping configuration routines 528 and 546 demands merely knowledge about the underlying business model but not of the underlying program structure. Thus, these rules might be entered by a user with business skills only. The rule based language generally comprises an interface allowing access to external access data (defined as source fields within the rules) and allowing deliverance of external output data (defined as destination fields). The rules are entered in terms of the rule based language wherein the user with business skills needs only to know the sets of access and output data for entering the rules connecting a set of output data with a set of access data.

Figure 5E:
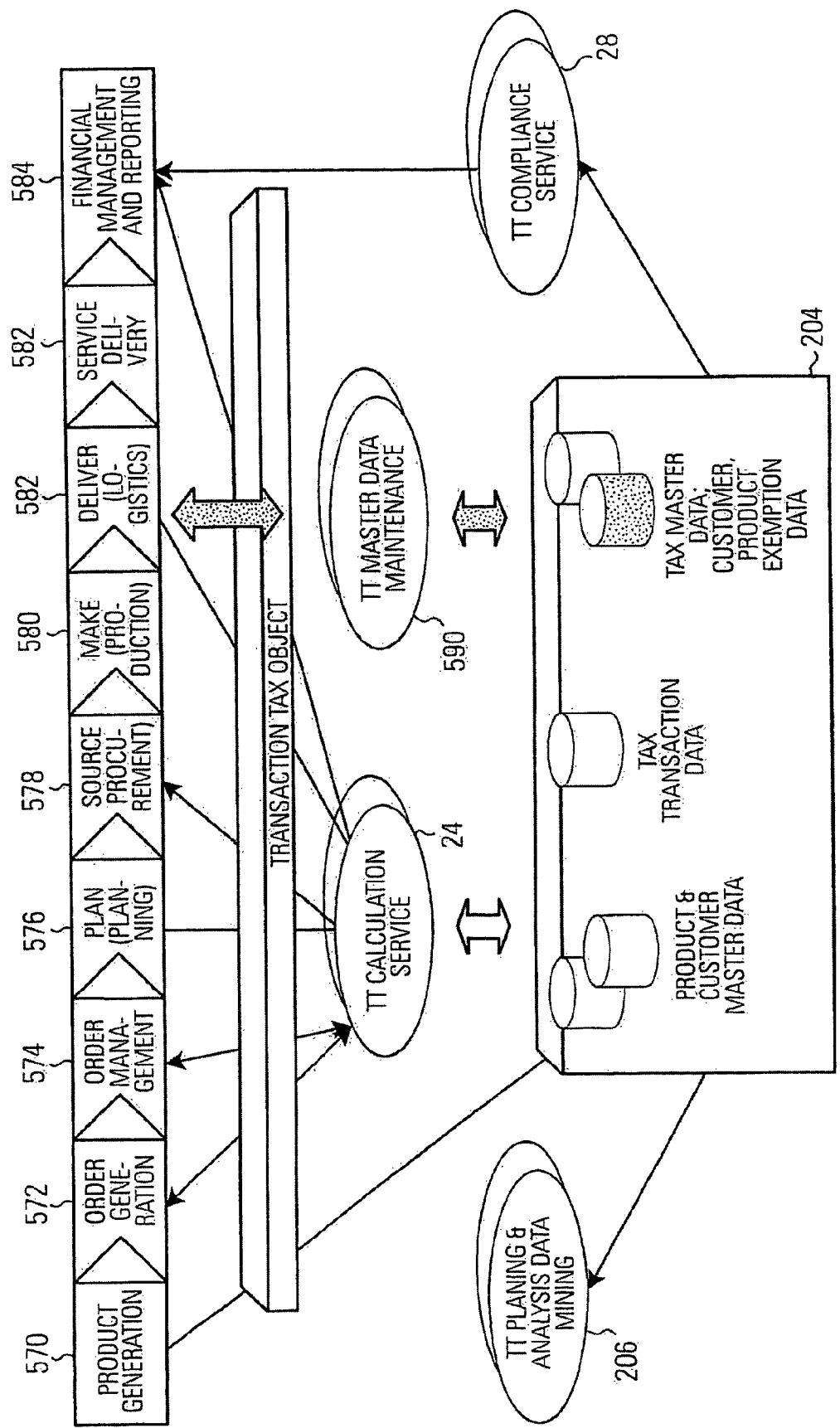
FIG. 5e shows a simplified diagram of a more complex business application communicating with the transaction taxation processing services via a standardized data model.

FIG. 5e shows a simplified diagram of a more complex business application 500 divided into different application routines which all may benefit of the TT services 20 as mentioned above. A first routine 570 deals with the product generation requiring the exchange of data with the data warehouse 204. This data exchange is performed via the standardized data model, namely the tax object. Further routines of the business application 500 might comprise an order generation 572, an order management 574, a planning 576, a procurement 578, a production 580 and a logistics routine 582 which all invoke the TT calculation service via the tax object (the direction(s) of the arrows between the business application modules and the TT calculation service 24 indicates the data flow direction (inbound and outbound data elements, cp. below). All mentioned modules 570-584 might further exchange data with the data warehouse 204 via module-specific or data warehouse specific date models for a transaction taxation master data maintenance, as shown with reference number 590. The same applies for the data exchange between the TT calculation service 24 and the data warehouse 204. The overall business organization further contains a delivering module 582 and a financial management and reporting 584, wherein the latter one invokes the TT compliance service 28 via the tax object. The TT compliance service retrieves information from the data warehouse 204 via a specific data model. The same applies for the data mining 206.

According to a preferred embodiment of the invention, the structure of the tax object transferred between the business application and the TT services 20, between external business applications or between different basic and micro services will now be described with respect to FIGS. 6a-6h. FIGS. 6a-6h show three tables "Inbound Elements", "Outbound Elements" and "Further processing elements" dividing the different data elements of the tax object into inbound elements (data elements which will be passed to a TT service 20 from an external application or an internal 11 service 20), outbound elements (data elements which are created, calculated or changed by the TT calculation service 24) and further processing elements, respectively (data elements which drive special processing either within the invoking application or within the TT service 20). In all three tables shown in FIGS. 6a-6h, the data elements are listed in a sequential order as indicated in the first column "Field No." (in practice, the tax object might not necessarily be sent with the data elements in the given order but may be sent as a XML document having the corresponding data element identifier). Each line of the tables contains a different data element (identified in the second column "Data element"), wherein some data elements are divided into different sub data elements (identified in the third column "Sub Data element"), for example in line 4 of the table inbound elements, the ship-from address data element is divided into the street, territory, province, country, city, postal code, state and country sub data elements.

Besides, the tax object is defined so as to provide data elements for at least two different jurisdictions. It has at least one data element which is used for one jurisdiction, but not for the other jurisdiction (for example, in line 32 of the table outbound elements the data element "Tax certificate applied" is US-specific), and it has at least one other data element which is used for the other jurisdiction, but not for the first one (for example, in line 92 of the table inbound elements the data element "Destination code" is EU-specific).

Furthermore, the tables describe in its fourth column "Type" the specific data element type for each data element, for example in line 48 the postal code is labeled as a character with five elements. The tables further show a more detailed description for each data element in their fifth columns "Description". The table "Inbound Data elements" further indicates in its sixth column "Required" whether the corresponding data element must be transmitted within the tax object when invoking the TT calculation service 24 (there may be different required data elements when invoking other TT services 20, i.e. the column "Required" deals only with the particular invocation of the TT calculation service 24). In particular, the data elements "company-ID", "ship-from address" and "destination/ship-to address" are the only three data elements which must be transmitted within a tax object to the TT calculation service 24. All other data elements might be supplemented according to the special request of a TT service 22 to 40. For example, when the TT calculation service 24 is invoked by the business application 500 as shown in FIG. 5b, besides the three required data elements, the data element "line item amount" (in line 120 of the table inbound elements) is transmitted within the tax object. Naturally, the transmitted tax object only contains the values of the different data elements, possibly supplemented with the corresponding data element identifier. When implementing the tax object in the form of an XML document further data elements, not yet shown in FIGS. 6a-6h, can be easily defined for any future enhancement requirements (further processing logic, etc.).

For example, the tax amount calculated by the TT calculation service 24 is returned within the tax object as the data element "Calculated tax amount" (field number 48 of the table "Outbound Data elements") to the business application 500. Implementing the tax object in a flexible data model, for example XML, eliminates the need to transmit all data elements (inbound, outbound and further processing elements) when transmitting a particular tax object (which would involve the transmission of roughly 230 data elements each time, most of which are deactivated). Therefore a particular transmitted data record may contain only data items complying with one jurisdiction, although the interface data model comprises data elements complying with various different jurisdictions, e.g. in different countries.

Hereinafter, a simplified example is given for an external business application invoking a TT calculation service 24 for tax calculation and will be described in more detail on the basis of the required mapping of the application specific data model to the standardized tax object.

For example, the external SAP business application invokes in step 508 of FIG. 5d the TT calculation services 24 which triggers an application subroutine creating a SAP export data record COM_TAX commonly used by the SAP business application for exporting data. The export data record might in this example consist of the data fields "prices_netprice" and "customer_ship from address". Hereby, the indicator preceding the "_" indicates the source address (for example a table name, etc.) whereas the indicator succeeding the "_" indicates the field name. It is assumed that when creating this export data record the data fields "net price" and "ship from address" are filled with the particular data values "500" and "DE", respectively. The export data record COM_TAX is transmitted to the mapping routine 522 of the interface module at the SAP business application side.

The mapping routine 522 requests in its step 522 the mapping configuration routine 538 for delivery of the set of configurable mapping rules which correspond to this particular external tax calculation invocation. In the specific example, the mapping rules might consist of a static, a constant and a dynamic mapping.

The static mapping might concern the mapping of the field "netprice" in the table "prices" to the field "line item amount" (as indicated in FIG. 7 in line 120) of the tax object. The following rule creates such a mapping:

| Rule Header Table | Rule Item Table |
|---|---|
| Rule No: 0001 → | Rule No: 0001 |
| Rule Type: S | Pos No: 01 |
| Dst Field: line item amount | Src Table: prices |
| Dst Offset: 0 | Src Field: netprice |
| Dest Length: 10 | Src Offset: 0 |
| Description | |

The rule No. 1 contains the entry "prices" in the source table field and the entry "netprice" in the source field (both mentioned entries are entered into the rule item table) and the entry "line item amount" in the destination field (this entry is entered into the rule header table). Furthermore, the value of the field "Pos No" of the rule item table is set to 1 since there is a static mapping (cp. entry "S" in "Rule Type" field of the rule header table) of the value of exactly one field in the source structure to exactly one field of the destination structure.

Similarly, a rule for a static mapping of the "customer_ship from address" to the destination field "ship-from address_country" (as indicated in FIG. 7 in line 8 of the tax object, wherein the mentioned field consists of a data element field "ship-from address" and a sub data element field "country" both together forming the destination field) has the following form:

| Rule Header Table | Rule Item Table |
|---|---|
| Rule No: 0002 → | Rule No: 0002 |
| Rule Type: S | Pos No: 01 |
| Dst Field: | Src Table: |
| ship-from address_country | customer |
| Dst Offset: 0 | Src Field: ship from address |
| Dest Length: 2 | Src Offset: 0 |
| Description | |

As an example for a constant mapping, the tax object might comprise a data field "version no" (provided in the reserved space table) which identifies the particular program version of the calling SAP business application. The corresponding constant rule has the following structure:

| Rule Header Table | Rule Item Table |
|---|---|
| Rule No: 0003 → | Rule No: 0003 |
| Rule Type: C | Pos No: 01 |
| Dst Field: version no | Src Table: |
| Dst Offset: 0 | Src Field: v4.01.A |
| Dest Length: 5 | Src Offset: 0 |
| Description | |

As a result, the fixed value "v4.01.A" will be assigned to the destination field "version no".

As an example for the dynamic mapping (which allows processing of the information from several source fields and mapping of the result to a particular destination field) the destination field "currency" of the tax object (cp. FIG. 7, line 84) will be considered. For example, in the country "Germany" the currency will be changed from "DM" to "Euro" at the end of year 2001 which means that the year of the transaction date is an indicator for the currency, i.e. the years . . . , "2000", "2001" indicate the currency "DM" whereas the years "2002", "2003", . . . indicate the currency "Euro" for Germany. A corresponding dynamic mapping will have the following form:

| Rule Header Table | Rule Item Table |
|---|---|
| Rule No: 0004 → | Rule No: 0004 |
| Rule Type: D | Pos No: 01 |
| Dst Field: currency | Src Table: customer |
| Dst Offset: 0 | Src Field: ship from address |
| Dest Length: 4 | Src Offset: 0 |
| Description | |
| | Rule No: 0004 |
| | Pos No: 02 |
| | Src Table: date |
| | Src Field: year |
| | Src Offset: 0 |

This rule contains one record in the rule header table and two records in the rule item table as indicated by the "Pos No" field counting the number of records of a single rule in the rule item table. The information is taken from the source tables "customer" and "date" and the respective fields "ship from address" and "year" whereas the mapping result is written into the destination field "currency". The table "date" with its source field "year" might not be part of the export data record COM_TAX and should therefore be directly accessed from SAP internal tables which are not transmitted to the mapping routine 522.

In the particular example given above, the lookup table will have the following entries:

| Lookup Table | | |
|---|---|---|
| Rule | Key | Result |
| . . . | . . . | . . . |
| 0004 | DE2000 | DM |
| 0004 | DE2001 | DM |
| 0004 | DE2002 | Euro |
| 0004 | DE2003 | Euro |
| . . . | . . . | . . . |

Thus, when reading the values "DE" and "2001" from the source fields "ship from address" and "year" in step 534, concatenating these values will give the result "DE2001". This result forms a generic key such as the ones listed in the lookup table in the middle column. The corresponding mapping result "DM" is then read from the right column in the lookup table and moved to the destination field "currency" in step 536.

A configuration of the rule might be performed by external access to the lookup table and changes to its content, for example by, accessing the lookup table responsive to the external tax calculation call and by changing its line "0004|DE2002|Euro" into "0004|DE2002|DM" (if the introduction of the currency "Euro" is postponed to year "2003" in Germany). This configuration may be accessible via a transaction call "Change mapping configuration SAP-Tax Object" giving access to the mapping configuration routine 538 and allowing changing of the corresponding rules. The advantage of user configurable mapping rules over hard coded mapping rules lies in the easy handling of changes to these rules (as can be seen from the above example) since the user only has to deal with these rules on a business level rather than on the machine level which requires skilled programming knowledge.

When defining the rules via the mentioned rule interpreter, the user enters a list of rules which define the data mapping from the SAP export data model COM_TAX into the data model of the tax object. As the tax object has the specific well-defined data elements "ship-from address_country", "version no" and "currency" the user has for example to deal with the following questions concerning these data elements:

which SAP-field contains the information of the particular data element?

is this SAP-field exported via the export data record COM_TAX?

otherwise, can it be found in a SAP database table (if yes, in which table)?

otherwise, what can be done to get this information in the system (for example, can it be derived from other SAP fields). In this case, the user has to define a number of more complex rules (for example, similar to IF . . . THEN . . . constructs and the like) to evaluate this information from other SAP fields.

In step 536, the destination data are brought in the particular data model language used for the transmission, for example XML. A corresponding XML document for the above example will have the following form (and might be transmitted in the body of an HTTP request):

```
<tax object>
    <inbound elements>
        <ship from address>
            <country>DE</country>
            <line item amount>500</line item amount>
            <currency>DM</currency>
    </inbound elements>
    <reserved space>
        <version no>v4.01.A</version no>
    </reserved space>
</tax object>
```

In the above presentation control commands including possible error messages and the like are omitted which, however, may be part of the tax object. These commands may be entered into the tax object and removed from the same in steps 540 and 542, respectively, where they are used for transmission control.

When the TT calculation service 24 has the same data model as the tax object, the mapping routine 526 in FIG. 5d, is reduced to a simple conversion of the XML document into a program understandable code (e.g., $C^{++}$ code, etc.).

The advantages of the standardized data model used for the transmission of business and control data elements can be easily seen from the above description of the simplified example. A programmer working with a particular program module (either the external SAP business application or the TT calculation service 24) needs only to know the particular data model of the program module he is working with and the data model of the standardized tax object but not the data model of the other program module. Consequently, he only needs to configure mapping rules (e.g. in steps 538 or 544) for mapping the data model of his program module to the one of the standardized tax object, and vice versa.

The TT logging service 26 shown in FIGS. 1 and 3 will now be described in more detail. "Logging" means storing of transaction-tax-related transaction data. In most jurisdictions it is required that transaction data of tax-relevant transactions are recorded on transaction-by-transaction basis. Furthermore, companies have often their own interests in recording tax-relevant transaction data for business-management analysis purposes. Recording of transaction data in a way which fulfills at least the minimum requirements of the tax laws in a certain jurisdiction enables a "transaction tax compliance reporting" (for that particular jurisdiction). The logged transactions form the basis for the tax filing, i.e. the calculation of the amount of transaction tax to be paid to the tax authorities and preparation of the corresponding tax declaration which has to be made in certain time intervals, for example monthly. The logged transaction data are also used for transaction-tax review by official and internal auditors. Logged transactions may be trade invoices, general ledger (G/L) bookings (i.e. bookings in a company's general account book which appear when a payment has been received or made), etc. In most jurisdictions, it, is not required to log every transaction-tax-related transaction for compliance reporting. For example, transactions with provisional character, such as offers or orders, need not be logged. The requirements as to which transactions have to be logged differ from jurisdiction to jurisdiction. They may even be different for different types of legal entities, for example corporations and partnerships. The definition of which transactions have to be logged may also be company-dependent since individual companies may wish to carry out a more comprehensive reporting than the minimum-required compliance reporting.

Also the definition of what data of a transition have to be logged differs from jurisdiction to jurisdiction and may depend on the company's legal type. For example, within Europe, Spain requires a more comprehensive recording of transaction data than Germany. Again, individual companies may wish to log more detailed transaction data than the minimum requirement of compliance reporting, so that the definition of what transaction data have to be logged may be company-dependent. The TT logging service 26 of FIGS. 1 and 3 enables such a variable kind of logging.

The TT logging service 26 is a software component which can be invoked independently of other basic services 8, in particular independently of the TT calculation service 24. This enables the use of different transaction tax calculation applications to the TT calculation service 24 (for example, the use of external tax calculation provided by external service providers) without affecting the TT logging service 26. Furthermore, it enables stored data, such as stored history or legacy data 220 generated by non-integrated tax calculation engines, to be loaded directly to the TT logging service 26, as is indicated by an arrow in FIG. 3. In contrast, in the known transition tax program products, the recording of transactions is intimately linked with the tax calculation, so that only those transactions which have previously been passed through for the program's tax calculation are recorded.

The TT logging service 26 is invoked by an HTTP request from the process and communication layer 6 together with an argument comprising transaction-related data, for example in the form of an XML document forming the body of the HTTP request. The transaction-related data elements of the argument are preferably identical with the transaction tax object or are a subset of the transaction tax object described in connection with FIGS. 6a-6h.

The rules defining which transactions and what transaction data are to be logged (called "log rules") are contained in the content service 22 in a form configurable by the user in a filing rules and templates configuration interface 218. The content service 22 is shared between different basic services 8, and therefore also contains rules and "meta data" for the other basic services 8, as shown in FIG. 3. In other embodiments (not shown), the content service is modular, the TT logging service then has a special log rule management service. When the TT logging service 26 is invoked it fetches all, or a subset of, the log rules and evaluates them with the data of the transaction for which it has been invoked. In the case in which only a subset is fetched, it is composed of those log rules which may be relevant for the decision whether the transaction has to be logged and what transaction data are to be logged. For example, in a transaction in which a good is shipped from Germany by a German seller, the subset of rules fetched from the content service 22 comprises all the log rules which relate to Germany.

The log definition is not hard-coded in the content service or the logging service application. Rather, the log rules can be input and modified by the user in a log rule configuration interface 214 which is part of the content service 22. The log rules can be entered by the user online in the form of a script language. After having fetched the script language log rules, the TT logging service 26 interprets them and processes the log request accordingly.

The TT logging service 26 has an auto-recognition functionality: it can decide itself whether a transaction is to be logged, and, if applicable, what data of the transaction are to be logged, by evaluating the log rules with data of the present transaction received together with the HTTP request which has invoked the TT logging service 26. Therefore, no previously invoked component (for example, the calculation service 22) needs to decide whether the present transaction is to be logged or not (if such a decision were taken by a previous component, the logging service could only be invoked when logging is required). Rather, since the TT logging service 26 takes this decision itself, it can be invoked for every event (i.e. for every transaction) without any parameter representing a log requirement. As a consequence, any application generating transactions can be used together with the TT logging service 26 without having to take care itself whether transactions have to be logged. This auto-recognition functionality enhances the modularity of the whole transition tax application since it enables the log requirement information to be concentrated in the content service 22 and the logging service 26 and the other services can be kept free of it.

The following table illustrates in a simplified way the log requirement rules for two different jurisdictions ("countries") and three different transaction types:

|  | country X | country Y |
|---|---|---|
| order | no logging required | no logging required |
| invoice | logging required | logging required |
| payment | no logging required | logging required |

When the TT logging service 26 is invoked with the data of a transaction as parameters, it evaluates the log requirement rules with the parameter data. If, in the above-mentioned example, the country of a transaction is "X", and the transaction type is "order" or "payment", no logging is performed. If, in contrast, the country is "X" and the transaction type is "invoice", logging is performed, based on further rules which define what transaction data have to be logged for the present transaction. For example, for a certain country with low logging requirements, only the invoice number, net price and tax of the transaction are logged. In a country with more comprehensive logging requirements, further transaction data, such as the buyer registration number, the product description, the tax rate applied, etc. are logged. If the country of origin is "Y" logging is also performed for the transaction type "payment", in the above example.

FIG. 7 is an exemplary flow chart of a method carried out by the TT logging service 26 of FIGS. 1 and 3. In step 602, the TT logging service component 26 is invoked, for example by receiving an HTTP request with transaction data as argument, which may be in the form of an XML document included in the body of the HTTP request. However, any other suitable invocation mechanism may be used. In step 604, the log rules which may be relevant for the present transaction are fetched from the content service 22. In step 606, the log rules are evaluated for the present transaction data and it is ascertained whether logging is required. If the answer is negative, in step 608, a flag is set in the transaction data to be output as an XML parameter list indicating "Transaction has not been logged". In step 610, the call to the TT logging service 26 is returned by sending an HTTP response with the XML parameter list to the origin of the original HTTP request. However, if the answer in step 606 is positive, the log rules are evaluated in step 612 as to what data have to be logged, using the input transaction data. In step 614, the data set to be logged is prepared (e.g. a data set consisting of invoice number, net price and tax). In step 616, the prepared data set is stored in the data warehouse by sending a corresponding request together with the data set to the data warehouse component 204. In step 618, a flag is added to the transaction data to be output as an XML parameter list indicating "Transaction has been logged". In step 620, the call to the TT logging service 26 is returned by sending an HTTP response with the XML parameter list to the origin of the HTTP request received in step 602.

In other preferred embodiments (not shown), the function of the TT logging service is extended so that it also may pre-select transactions which require a transaction tax calculation. In order to carry out such a pre-selection, the logging service is then invoked before the invocation of the TT calculation service for the first time. In these embodiments, it fetches and evaluates rules which indicate whether a transaction tax calculation is required for a given transaction, sets a corresponding flag and returns the transaction data together with this flag. Depending on the existence or absence of this flag, the process and communication layer 6 will then invoke the TT calculation service or will skip it. The logging service can be invoked a second time in order to perform the actual logging process, as was described above.

By using the described logging service it is ensured that the logged data are in compliance with the requirements of the pertinent jurisdiction. One and the same logging service can be used for the different jurisdictions of interest. The "content", i.e. the rules reflecting the logging requirements of the different jurisdictions can easily be configured by the user via a user interface, without the need to change hard-coded programs. The logging service can be invoked independently of other program components, such as transaction tax calculation components, and does not need logging-specific invocation parameters in order to perform the logging task. This enables the process layer to, use independent services for TT calculation and TT logging. For example, an external service provider can be used for TT calculation, but the TT logging can be performed in-house by using the described TT logging service. Alternatively, a TT logging service of the described kind can be offered as an e-service over the Internet. Such a service will not require the customer to specify whether and how a logging has to be performed for a given transaction. Rather, this determination can be offered as a part of the e-service.

The TT filing service 30 of FIGS. 1 and 3 enables automatic preparation and filing of transition tax declarations for different jurisdictions.

Conventionally, transactional data, mostly in aggregated form, is retrieved by various reports, which are consolidated manually. Tax declaration forms have to be obtained from the tax authorities and filled out manually, based on the results of the manual report consolidation. The preparation of tax declarations for different jurisdictions requires different ways of processing, and even changes of the official requirements in one jurisdiction may require changes in the processing. In contrast, the filing service 30 enables the tax declaration and filing to be carried out automatically. The processing is the same for different jurisdictions and remains unchanged when official requirements are changed. The filing service 30 is based on logged transaction data which have previously been generated by the logging service 26 or any other suitable logging application. Since the data of certain transactions (in particular booking transactions) may be incomplete, the auto-completion service 42 (FIGS. 1 and 9) is invoked preferably by the TT logging service 26 before logging the incomplete transaction data or after the logging step, but before the filing service 30 is invoked. The auto-completion service 42 completes such incomplete transaction data which enables the preparation of the tax declaration according to the tax compliance requirements without manual intervention.

A tax declaration normally represents an aggregation of transaction data, in particular the calculation of total numbers, such as the total amount of transition tax received in the declaration time period. In jurisdictions with value added tax, also the total amount of transition tax paid in the declaration time period as well as the difference between the received and paid amounts are calculated. Typically, the declaration has to be filed within short time intervals, for example monthly.

In order to initiate the filing process, the user has to input a corresponding request to the process and communication layer 6 (FIG. 1) via a user interface. Together with the request, the user has to indicate for which country or jurisdiction the declaration shall be filed. In other, alternative embodiments, the tax filing process is initiated automatically when certain legal conditions are fulfilled, for example when the term of a tax declaration interval is reached, e.g. on the last day of each month. The process and communication layer 6 translates the user request or the automatically generated request into an HTTP request sent to the filing service 30. The request has an argument representing tax-filing-related information, such as the country or jurisdiction of the declaration to be prepared, the name of the company for which the declaration is to be prepared (if the automatic tax declaration filing is offered as a service for several companies); the time period which shall be covered by the tax declaration, etc. Moreover, process-related data, such as an identification of the user who has initiated the filing process, is transmitted as argument. The argument data can, for example, be in the form of an XML document forming the body of the HTTP request. However, any other suitable invocation and parameter transmittal mechanism may be used.

Figure 8:
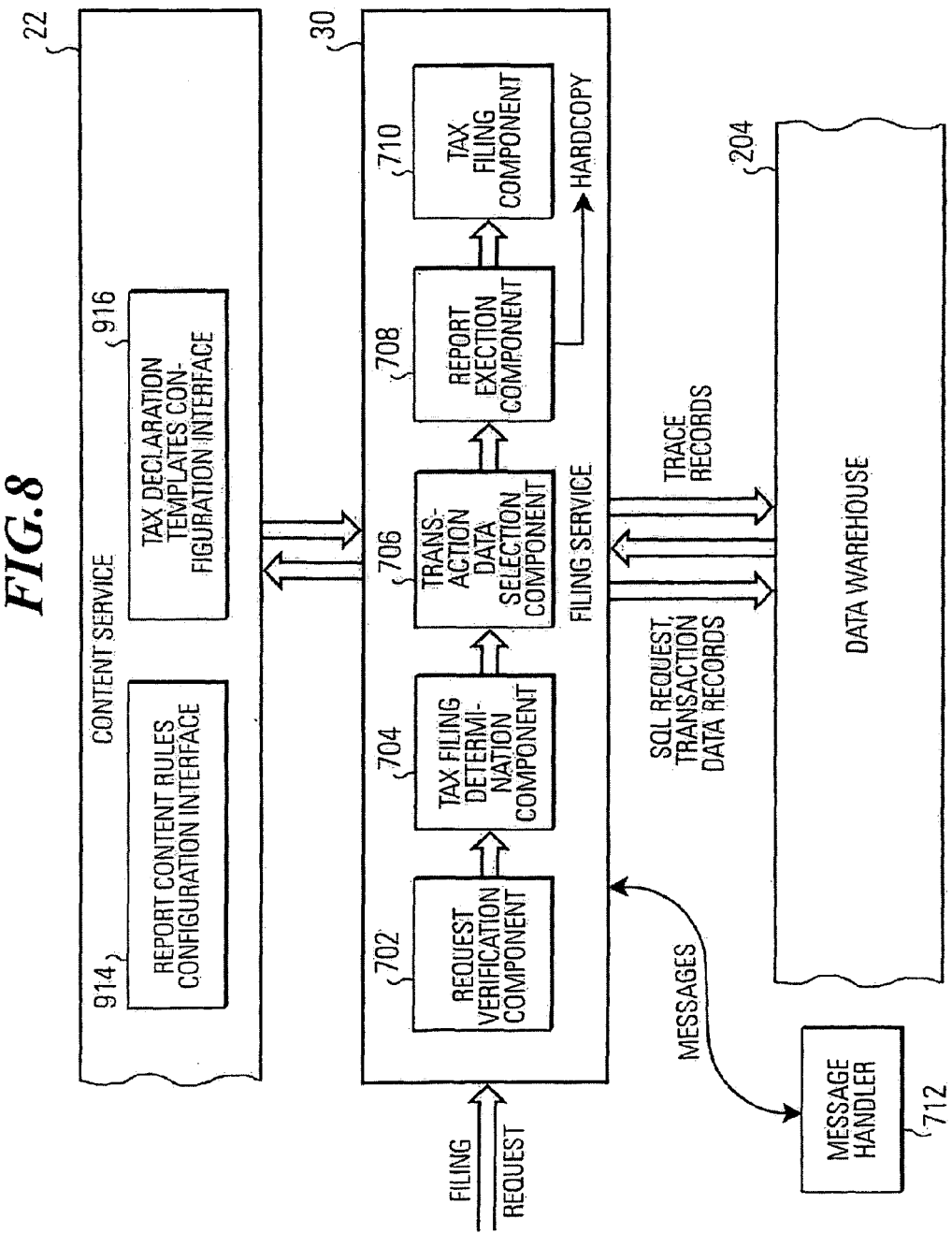
FIG. 8 is a diagram of the functional architecture of a transition tax filing service.

In FIG. 8 the filing service 30 is shown in more detail. It is composed of a request verification component 702, a tax filing determination component 704, a transaction data selection component 706, a report execution component 708, and a tax filing component 710. The incoming tax filing request from the process and communication layer 6 is first processed by the request verification component 702. It verifies that certain conditions are fulfilled, for example, that the user who has initiated the filing process is authorized to do so, that the specified country or jurisdiction is existent and is one of the countries/jurisdictions which can be processed by the filing service 30, that the time interval for which the preparation of a tax report is requested is correct, etc. If the outcome of the request verification is negative, the tax filing process is either terminated (e.g. if the user is not authorized) or a message is sent to a message handler 712 asking for a confirmation by the user or another kind of user intervention (for example, if the tax declaration processing for the specified country and time interval has already been carried out, the user is asked to confirm that it should be repeated).

However, if the result of the request verification is positive, the tax filing determination component 704 is activated. Its task is to fetch report content rules and tax declaration templates for the country or jurisdiction for which the tax declaration shall be prepared from the content service 22. To this end, the tax filing determination component 704 sends a corresponding request to the content service 22 which, in turn, returns the requested rules and templates.

Then, the transaction data selection component 706 is activated. Its task is the selection of the transaction data records which are required for the preparation of the tax declaration on the basis of the original filing request and the rules received from the content service 22. More precisely, the transaction data selection component 706 has the actual selection carried out by the data warehouse 204. To this end, the selection component 706 translates the definition provided by the report content rules as to what transaction data are needed for the preparation of the present tax declaration into a corresponding Standard Query language (SQL) data retrieval command. This SQL command is sent to the data warehouse 204, which in turn processes it, i.e. selects transaction data records from the stored transaction data according to the SQL command and returns the selected transaction data to the transaction data selection component 706.

After or during the data selection process, the report execution component 708 is activated. It has mainly two tasks: Its first task is to consolidate the selected transaction data. Consolidation means determination of numbers characterizing the selected transaction data globally, for example the total number of transactions, the accumulated amount of transaction tax received, the accumulated amount of transaction tax paid, the difference of these two accumulated amounts, etc. The way in which the transaction data are to be consolidated is also defined in the report content rules fetched from the content service 22. The second task of the report execution component 708 is to enter the results of the transaction data consolidation into the corresponding fields of the text declaration template, which has also been received from the content service 22. The result is a finished tax declaration in compliance with the legal requirements of the jurisdiction in which the declaration is to be filed. In some jurisdictions, it may be required to present not only consolidated data, but also individual transaction data. For these jurisdictions, the report execution component 708 appends a data record for each transaction in the legally required format, which can also be defined by the report content rules fetched from the content service 22.

The result of the process carried out by the report execution component 708 is a finished tax declaration in electronic form. For jurisdictions which allow an electronic filing of transaction tax declarations, the tax filing component 710 is then activated. It prepares the electronic tax declaration for transmission over a network (e.g. by encrypting it), opens a network connection to the tax, authority's receiving server and dispatches the tax declaration prepared in such way to the tax authority's receiving server. The network used for this dispatch may be the Internet or, for example, a telecommunication network which allows point-to-point access (such as a public telephone network). Also the actual payment of the accumulated transition tax may be effected automatically via an electronic bank transfer. To this end, an electronic transfer component (not shown) is provided in certain preferred embodiments. If, however, the jurisdiction for which the tax declaration is to be prepared does not allow electronic filing of transition tax declarations, a hard copy of the electronic tax declaration prepared by the report execution component 708 is printed out and sent as a paper document to the tax authority.

The filing service 30 also has a tracing functionality: All steps carried out by the several components of the filing service 30 can be reported in the form of trace records which are stored in the data warehouse 204. This enables the user to trace how the numbers appearing in the finished tax declaration have been generated. The tracing functionality not only serves as a debugging instrument. It can also serve as a proof for the correctness and compliance of the way in which the tax declaration has been prepared. Based on the stored trace records, an official or internal auditor can verify the correctness and compliance of the tax declaration.

A user confirmation may also be requested at other stages of the tax filing preparation process than the above-described request verification stage. For example, before carrying out the actual electronic filing of the tax declaration by means of the tax filing component 710, the filing service 30 asks for a user confirmation. In addition, in preferred embodiments, the filing service 30 enables the user to intervene manually at different stages of the text declaration preparation process. For example, the user may be enabled to scan the transaction data selected by the transaction data selection component 706 and to change or discard transaction data records manually (however, it is generally preferred that such manual interaction is avoided in particular in view of the auto-completion functionality of the auto-completion service 42 which automatically completes incomplete transaction data records. The message handler 712 provides the user interface for these confirmation and intervention tasks. The communication is carried out by messages interchanged between the message handler 712 and the filing service 30.

The tax declaration templates as well as the rules which define which transaction data records have to be selected, how the selected transaction data are consolidated and where the results of the consolidation are to be put in the templates (called "report content rules") are contained in the content service 22 in a form configurable by the user. The report content rules and the tax declaration templates are not hard-coded in a content service 22 or the filing service application 30. Rather, they can be input and modified by the user in a report content rules configuration interface 714 and a tax declaration templates configuration interface 716 which are both part of the content service 22. The report content rules can be entered by the user online in the form of a script language. After having fetched the script language content rules, the filing service 30 interprets them and processes them accordingly. As already mentioned above, the content service 22 is shared, between different basic services 8, and therefore also contains rules and "meta data" for the other basic services 8, as shown in FIG. 3. In other preferred embodiments (not shown) the content service is modular, the TT filing service 30, then has a specialized report content service component. Although it is generally possible that the filing service 30 fetches all report-related rules and templates, it is preferred that it fetches only that subset of rules and templates which is relevant for the jurisdiction or country for which the tax declaration is being prepared.

By using the described tax filing service, it is ensured that the evaluation of transaction tax data and the resulting tax declaration are in compliance with the requirements of the pertinent jurisdiction. One and the same filing service can be used for different jurisdictions, and the processing steps to be performed by the user are the same for all jurisdictions. The "content", i.e. the rules reflecting the tax declaration requirements as well as the templates can easily be configured by the user via a user interface, without the need to change hard-coded programs. The tax declaration is prepared automatically and can be filed electronically. The filing service is independent of other program components, such as transaction tax calculation components and logging components. This enables the process layer to use independent services for TT calculation, TT logging and TT filing. For example, an external service provider can be used for TT calculation, but the TT logging can be performed in-house by using the described TT filing service. Alternatively, a TT filing service of the described kind can be offered as an e-service over the internet. The transaction data records could, for example, be resident at the e-service's customer and send to the tax declaration service provider together with the request over the Internet.

Figure 9:
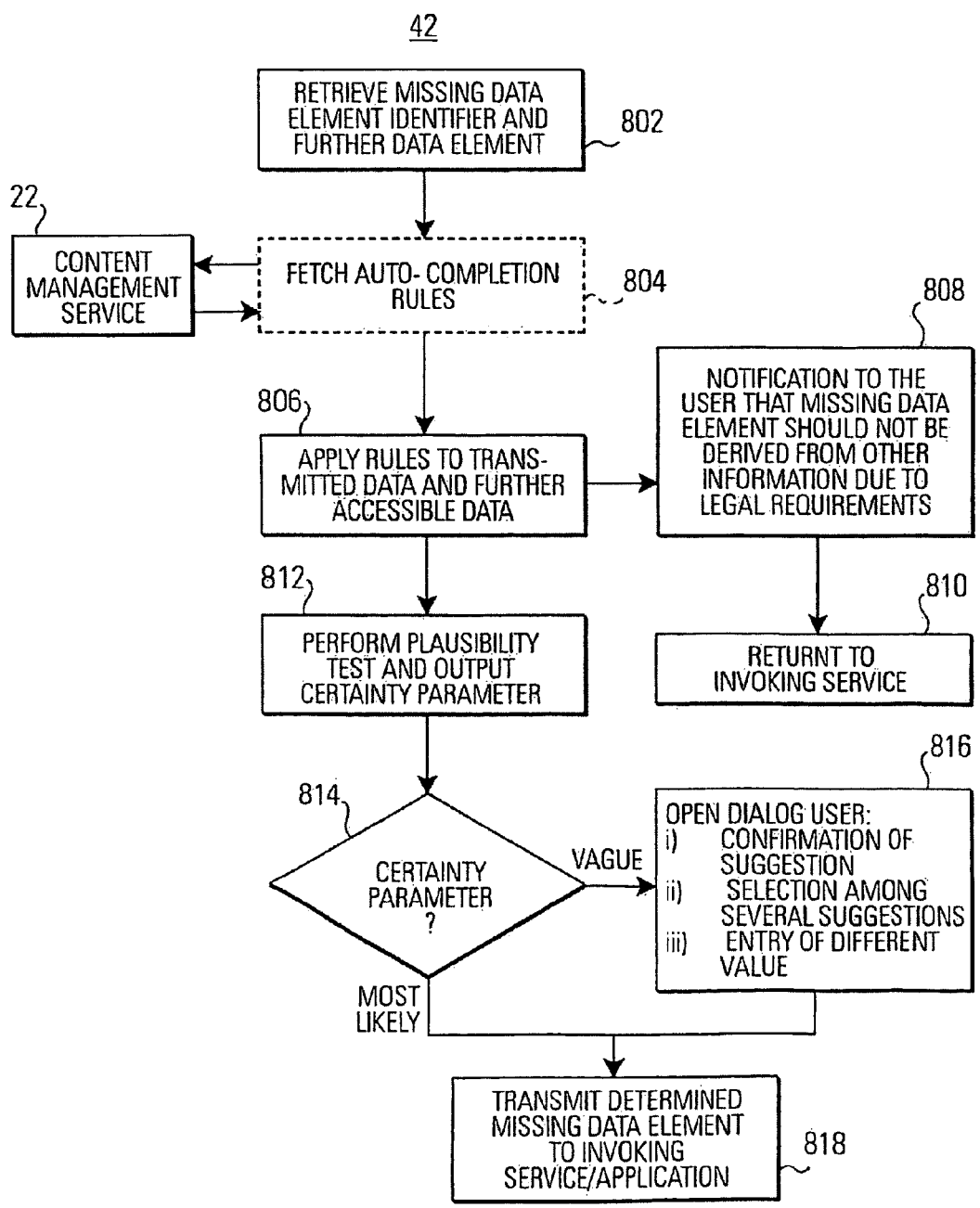
FIG. 9 shows an exemplary flow chart of an auto-completion module according to a preferred embodiment of the invention.

FIG. 9 shows a exemplary flow chart of a method carried out by an auto-completion service module 42 according to a preferred embodiment of the invention. In the interest of a better understanding of this particular embodiment the normal situation when calling a particular TT service 22 to 40 will be briefly explained. Each time, a particular TT service 22 to 40 is called a set of data elements, for example in the form of the tax object, might be transmitted which will be used by the called TT service 22 to 40 for performing its proper function. Furthermore, the called TT service 22 to 40 might have access to further data elements, such as are stored in the data warehouse. However, the situation might occur that a particular TT service 22 to 40 needs further information in order to accomplish its internal operations. This might be best seen with respect to the particular example of the logging service 26. When invoking the logging service 26 for logging tax-relevant information the situation might occur that the invoking TT service 22 to 40 transmits data elements which it generally considers to be sufficient for the logging service 26 to accomplish the logging operation. In particular, an invoking TT service 22 to 40 or external application might transmit all booking data listed in the general account book for a specific payment which has been received or made. However, the logging service 26 might recognize on the basis of the fetched logging rule for a particular country that it requires logging of the corresponding invoice number and date as well (for example in Germany, some legal entities like partnerships have to log balancing reports including invoice dates). This invoice number and invoice date might not be transmitted among the data elements. According to the prior art a dialog with the user had to be opened enabling the user to manually enter the missing information.

According to the preferred embodiment of the invention shown in FIG. 9 this detrimental situation will be avoided as follows: If the logging service 26 recognizes that it is not able to log a particular data element as required by the applied logging rule it might call the auto-completion service 42 depicted in FIG. 9. Thereby, it transmits transaction-related data elements comprising the missing data element identifier. The transaction-related data elements may further comprise all data elements currently used by the logging service 26 for complying with the actual logging event. These data elements are preferably identical with or a subset of the standardized data model, the tax object, described with respect to FIGS. 6a-6h. In the example shown in FIG. 9 the auto-completion service 42 is a software module forming a basic service which can be invoked independently of other basic services, for example by an HTTP request from the process and communication layer 6. Alternatively, the auto-completion service 42 might be implemented as a micro service in the overall TT structure or might be directly integrated in form of a software component into the particular calling service (in this example into the logging service 26). Naturally, all other TT services 22 to 40 as discussed with respect to FIGS. 1 to 8 may benefit from an auto-completion function. In particular the TT compliance report service 28 profits from such an, auto-completion function as a lot of transactions like direct G/L entries do not carry all information required by the particular compliance report. Moreover, as discussed with respect to FIGS. 1 and 3 the compliance report service 28 may consider different reporting areas (management, audits, etc.) all having different reporting needs. Finally, it will reduce different interpretations of these kinds of transactions by different users and enable one compliance view. In addition, the various different data extractions for compliance reporting will be reduced to exceptions only. The preferred embodiment particularly solves the problem of the prior systems that hard copied information, needed to be stored somewhere in the system in order to enable tracking and verifying correctness of transactions (which often was forgotten and needed to be manually added for each transaction).

Returning to FIG. 9 the steps performed by the auto completion service module 42 will be discussed in more detail. In step 802 the module 42 receives the transmitted data elements (for example by means of an interface component), in particular the missing data element identifier. In an optional step 804 it might fetch a set of completing rules from the content management service 22 in a user-configurable form. As already discussed with respect to the logging service 26 shown in FIG. 7 the content management service 22 also contains other rules and "meta data" for other basic services (see above). The auto completion service 42 might fetch only a subset of completing rules concerning the particular missing data element. If the step 804 is not provided the auto completion service 42 might contain an internally stored set of completing rules for all or a subset of missing data elements (in the latter case, different auto completion services 42 associated to different TT services 22 to 40 may be provided which only need the subset of missing data elements occurring in the specific TT service 22 to 40). In a step 806 it applies the set of completing rules (for example by means of an evaluation component) with regard to the missing data element while having access to the transmitted data elements as well as to data elements stored in the data warehouse, etc. In general, the completing rules are similar to the mapping rules described with regard to the above preferred embodiments of the invention. The difference, however, between these rules lies in the specific certainty a missing data element might be identified by both sets of rules. In the above mapping rules, each data element is exactly determined from one or a set of source fields (in the above example, the "line item amount" used by the TT calculation service 24 is exactly determined from the source field "prices_netprice", similarity the "currency" is exactly determined from the "customer_country" and "date_year" source fields). If for example a booking in the general account book lacks the corresponding invoice number(s) or date(s) (cp. above) this number, might be derived from the customer name identified among the information for this booking. A corresponding completing rule might enable the auto-completion service 42 in step 806 to search the data warehouse for the customer name and for corresponding invoice numbers. The simplest case occurs if only one invoice number will be found. Then, the booking will most probably correspond to the found invoice number which may be further verified by comparing the found invoice amount and the booking amount in the ledger. A more complicated case occurs if several invoice numbers are found and none of the corresponding invoice amounts corresponds to the booking amount in the ledger. Then, a kind of artificial intelligence implemented in more complex completing rules might try to add all open invoice amounts or all combinations of open invoice amounts and compare the results with the booking amount. A correspondence between such a combination and the booking amount implies a likely relationship of the missing invoice numbers and the booking amount.

Preferably, the completing rules are not hard coded in the content management service 22 or the auto-completion service module 42. Rather, the completing rules can be input and modified by the user via a completing rule configuration interface which may be part of the content management service 22 or the auto-completion-module 42. The completion rules can be entered by the user online in the form of a script language.

Moreover, the "intelligent" completing rules might be configured to consider jurisdictional requirements when completing missing information. For example, if an outside invoice merely shows the gross amount (i.e. the before-tax amount and the value added tax rate are added and not separately listed in the invoice) the auto-completion service module 42 might calculate the value added tax rate on the basis of the addressee's location, the corresponding jurisdiction to be applied and the listed gross amount. However, some jurisdictions (for example the German jurisdiction) might generally forbid the derivation of value added tax rates from gross amounts. Consequently, in such a case the auto-completion service 42 might notify the user about this particular event in a step 808 (for example by means of an optional notification component), i.e. that it will consider the gross amount not to contain a value added tax rate. Generally, if the applied completing rules lead to the result that the missing data element should not be derived from other information due to legal or other requirements the user will be notified and the auto-completion service 42 returns to the invoking service in step 810.

Otherwise the likelihood of the determined value for the missing data element to be valid will be evaluated in a plausibility test 812 (for example by means of a plausibility checking component). Therein, the likelihood may either be determined on the basis of a fixed certainty value associated with the corresponding completing rule leading to the determined value for the missing data element. This fixed certainty value might for example indicate that this completing rule leads most likely or only vaguely to the information for the missing data element. Apparently, there are numerous other possibilities for deriving such a certainty value. Preferably, the plausibility test returns the certainty value according to the following procedure. As can be seen from the above particular examples, there are numerous possibilities for implementing completing rules deriving information about missing data elements. Therefore, several different completing rules may be configured to get several suggestions about the missing data element from several different sources. The set of suggestions obtained will then be evaluated by means of the plausibility tests. A very simple plausibility test would consist of comparing all suggestions delivered by this set of completing rules and setting a certainty value either to "most likely" if all suggestions are equal to each other or to "vague" if at least one suggestions differs from the other ones.

The service module 42 then proceeds to step 814 where the certainty value is compared with a predetermined threshold parameters, for example "most likely" and "vague". If the certainty value is equal to "vague" the auto-completion service 42 proceeds to step 816 where it opens a dialog routine with the user suggesting its particular result or results for completing the missing data element and asking for confirmation of the suggested result or for selection of one of the several results. Furthermore, the user might be enabled during this dialog to enter a completely different value for the missing data element if the suggestions are not acceptable. Naturally, the service 42 also proceeds to step 816 when it is unable to obtain any value for the missing data element and asks for manual entry of the data element.

If in step 814 the certainty value is determined to be equal to the threshold parameter "most likely" the auto-correlation service 42 will directly proceed to step 818. Similarly, step 808 subsequently proceeds to step 818 either with the confirmed suggestion, the selected suggestion of the missing data element or the user-entered value of the missing data element. In step 818 the auto-completion service 42 returns the missing data element to the invoking TT service 22 to 40.

Summarizing, subject to certain reporting requirements defined by tax authorities (cp. the description with respect to the filing service 30), by the company management, the audit requirements and others as appropriate, the auto completion service 42 intelligently and as far as possible automatically calculates or supplies missing information.

With the preferred embodiments, a more flexible and effective data exchanging functionality is provided than it was previously the case. Thus, a general purpose of the preferred embodiments is to provide improved methods, an improved data record, software interface, data warehouse module and software application for transaction-tax data exchange.

All publications and existing systems mentioned in this specification are herein incorporated by reference.

Although certain methods and products constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A computer-based method comprising:
    exchanging, by a first transaction-tax-related application executed by a computer, transaction-related data with at least a second transaction-tax-related application according to a standardized transaction-tax interface data model, wherein the first transaction-tax-related application uses a first application-specific data model; and mapping, by the computer, between data elements of the first application-specific data model and corresponding data elements of the standardized transaction-tax interface data model,
    wherein the standardized transaction-tax interface data model is defined so as to provide data elements at least for a first jurisdiction and a second jurisdiction, wherein the standardized transaction-tax interface data model has at least one first data element which is used for transaction tax calculation in the first jurisdiction, but is not used for transaction tax calculation in the second jurisdiction, and at least one second data element which is used for transaction tax calculation in the second jurisdiction, but is not used for transaction tax calculation in the first jurisdiction.

2. The method of claim 1, wherein the second transaction-tax-related application uses a second application-specific data model, the method further comprising:
mapping between data elements of the second application-specific data model and corresponding data elements of the standardized transaction-tax interface data model.

3. The method of claim 2, wherein the first and second application-specific data models are different from the standardized transaction-tax interface data model.

4. The method of claim 2, wherein the first and second application-specific data models are different from each other.

5. The method of claim 1, wherein at least one of the first and second transaction-tax-related transaction applications is one of the following modules:
i) a transaction tax logging module,
ii) a transaction tax compliance module,
iii) a transaction tax filing module,
iv) a transaction tax calculation module,
v) a transaction tax content module, and
vi) a transaction tax database for storing transaction-related data.

6. The method of claim 5, wherein at least one of the first and second transaction-tax-related applications is one of a basic and a micro service module.

7. The method of claim 1, wherein the mapping is governed is defined by rules that are configurable by a user.

8. The method of claim 7, wherein the rules are implemented by a lookup table.

9. A non-transitory computer-readable storage medium containing a software interface executable by a computer to link a first transaction-tax-related application with at least a second transaction-tax-related application, the interface being implemented such that data are exchangeable between the first and the second transaction-tax-related applications according to a standardized transaction-tax interface data model, wherein the first transaction-tax-related application uses a first application-specific data model;
wherein the software interface further comprises a first mapping component to map between data elements of the first application-specific data model and corresponding data elements of the standardized transaction-tax interface data model;
wherein the standardized transaction-tax interface data model is defined so as to provide data elements at least for a first jurisdiction and a second jurisdiction, wherein the standardized transaction-tax interface data model has at least one first data element which is used for transaction tax calculation for the first jurisdiction, but is not used for transaction tax calculation for the second jurisdiction, and at least one second data element which is used for transaction tax calculation for the second jurisdiction, but is not used for transaction tax calculation for the first jurisdiction.

10. The non-transitory computer-readable storage medium of claim 9, wherein the second transaction-tax-related application uses a second application-specific data model, the software interface comprising a second mapping component for mapping between data elements of the second application-specific data model and corresponding data elements of the standardized transaction-tax interface data model.

11. The non-transitory computer-readable storage medium of claim 10, wherein the first and second application-specific data models are different from the standardized transaction-tax interface model.

12. The non-transitory computer-readable storage medium of claim 10, wherein the first and second application-specific data models are different from each other.

13. The non-transitory computer-readable storage medium of claim 9, wherein at least one of the first and second transaction-tax-related transaction applications is one of the following modules:
i) a transaction fax logging service module,
ii) a transaction tax compliance module,
iii) a transaction tax filing module,
iv) a transaction tax calculation module,
v) a transaction tax content module, and
vi) a transaction tax database for storing transaction-related data.

14. The non-transitory computer-readable storage medium of claim 13, wherein at least one of the first and second transaction-tax-related applications is one of a basic and a micro service module.

15. The non-transitory computer-readable storage medium of claim 9, wherein the first mapping component enables a user to input and configure rules which define how the data element mapping is performed.

16. The non-transitory computer-readable storage medium of claim 10, wherein the second mapping component enables a user to input and configure rules which define how the data element mapping is performed.

17. The non-transitory computer-readable storage medium of claim 15, wherein the rules are implemented via a lookup table.

18. A non-transitory computer-readable storage medium containing a first transaction-tax-related software application executable by a computer, the transaction-tax-related software application including an interface for linking the first transaction-tax-related application with at least a second transaction-tax-related application, the interface being implemented such that data are exchangeable between the first and the second transaction-tax-related applications according to a standardized transaction-tax interface data model, wherein the first transaction-tax-related application uses a first application-specific data model;
wherein the interface further comprises a first mapping component to map between data elements of the first application-specific data model and corresponding data elements of the standardized transaction-tax interface data model;
wherein the standardized transaction-tax interface data model is defined so as to provide data elements at least for a first jurisdiction and a second jurisdiction, wherein the standardized transaction-tax interface data model has at least one first data element which is used for transaction tax calculation in the first jurisdiction, but is not used for transaction tax calculation in the second jurisdiction, and at least one second data element which is used for transaction tax calculation in the second jurisdiction, but is not used for transaction tax calculation in the first jurisdiction.

* * * * *

UNITED STATES PATENT AND TRADEMARK OFFICE
CERTIFICATE OF CORRECTION

PATENT NO.       : 8,694,394 B2
APPLICATION NO.  : 10/495634
DATED            : April 8, 2014
INVENTOR(S)      : Wolfgang Bross et al.

It is certified that error appears in the above-identified patent and that said Letters Patent is hereby corrected as shown below:

In the Claims

In column 32, line 12, in Claim 13, delete "fax" and insert -- tax --, therefor.

Signed and Sealed this
Third Day of March, 2015

Michelle K. Lee
*Deputy Director of the United States Patent and Trademark Office*